United States Patent
McNeish

(10) Patent No.: US 12,365,954 B2
(45) Date of Patent: *Jul. 22, 2025

(54) SYSTEM FOR PROCESSING RED MUD AND METHOD OF PROCESSING RED MUD

(71) Applicant: RED MUD ENTERPRISES LLC, New York, NY (US)

(72) Inventor: Gary McNeish, Manchester (GB)

(73) Assignee: RED MUD ENTERPRISES LLC, New York, NY (US)

( * ) Notice: Subject to any disclaimer, the term of this patent is extended or adjusted under 35 U.S.C. 154(b) by 279 days.

This patent is subject to a terminal disclaimer.

(21) Appl. No.: 17/104,970

(22) Filed: Nov. 25, 2020

(65) Prior Publication Data
US 2021/0079488 A1 Mar. 18, 2021

Related U.S. Application Data

(63) Continuation-in-part of application No. 16/533,232, filed on Aug. 6, 2019, now Pat. No. 10,851,007.

(51) Int. Cl.
C21B 13/00 (2006.01)
C21B 13/08 (2006.01)
(Continued)

(52) U.S. Cl.
CPC .......... C21B 13/0006 (2013.01); C21B 13/08 (2013.01); C21B 13/14 (2013.01);
(Continued)

(58) Field of Classification Search
CPC ....... C21B 13/0006; C21B 3/08; C21B 13/14; C22B 3/02; C22B 21/0092; C22B 34/1213; C22B 34/22; C22B 34/32; C22B 47/00
(Continued)

(56) References Cited

U.S. PATENT DOCUMENTS 1,760,992 A * 6/1930 Palmer ................ C22B 34/1209
209/40
2,830,892 A 4/1958 Udy
(Continued)

FOREIGN PATENT DOCUMENTS

CN 101463426 A 6/2009
CN 102432074 A 5/2012
(Continued)

OTHER PUBLICATIONS http://www.linkedin.com/pulse/red-mud-recycling-its-use-building-materials-gary-mcneish?trk=article-ssr-frontend-pulse_more-articles_related-conte.com, "Red Mud Recycling and its Use as Building Materials" published Jul. 6, 2016, printed on Feb. 9, 2023 (14 pages).
(Continued)

Primary Examiner — Melissa S Swain
(74) Attorney, Agent, or Firm — Cowan, Liebowitz & Latman, P.C.; Anastasia Zhadina

(57) ABSTRACT

A method of processing red mud comprising: heating red mud to a predetermined temperature; grinding the red mud to a predetermined particle size; and physically extracting iron components from the red mud; physically extracting aluminum components from the red mud, said physically extracting of aluminum components being separate from the physically extracting of iron components, wherein the steps of physically extracting iron components and physically extracting aluminum components are performed without requiring addition of chemical additives to the red mud.

14 Claims, 13 Drawing Sheets

(51) Int. Cl.
    *C21B 13/14*     (2006.01)
    *C22B 3/02*     (2006.01)
    *C22B 21/00*     (2006.01)
    *C22B 34/12*     (2006.01)
    *C22B 34/22*     (2006.01)
    *C22B 34/32*     (2006.01)
    *C22B 47/00*     (2006.01)

(52) U.S. Cl.
    CPC ............ *C22B 3/02* (2013.01); *C22B 21/0092* (2013.01); *C22B 34/1213* (2013.01); *C22B 34/22* (2013.01); *C22B 34/32* (2013.01); *C22B 47/00* (2013.01)

(58) Field of Classification Search
    USPC .......................................................... 423/121
    See application file for complete search history.

(56) References Cited

U.S. PATENT DOCUMENTS

| | | | |
|---|---|---|---|
| 2,924,513 A | | 2/1960 | Altimer et al. |
| 2,939,580 A | | 6/1960 | Carpenter |
| 3,295,924 A | * | 1/1967 | Colombo ............ C01F 7/08 |
| | | | 423/113 |
| 10,851,007 B1 | * | 12/2020 | McNeish ............ B03C 1/10 |

FOREIGN PATENT DOCUMENTS

| | | |
|---|---|---|
| CN | 103025900 A | 4/2013 |
| CN | 103290207 A | 9/2013 |
| CN | 107385197 A | 11/2017 |
| CN | 109160744 A | 1/2019 |
| CN | 109439894 A | 3/2019 |
| CN | 109943706 A | 6/2019 |
| KR | 101900672 B1 | 9/2018 |
| RU | 2479648 C1 | 4/2013 |
| RU | 2542177 C1 | 2/2015 |
| RU | 2634106 C1 | 10/2017 |
| RU | 2640317 C1 | 12/2017 |
| RU | 2640317 C2 | 12/2017 |
| WO | 03/066915 A1 | 8/2003 |
| WO | 2012/001700 A1 | 1/2012 |
| WO | 2016/085961 A1 | 6/2016 |

OTHER PUBLICATIONS https://www.linkedin.com/pulse/uses-red-mud-bauxite-residue-gary-mcneish?trk=article-ssr-frontend-pulse_more-articles_related-content-card, "Use for Red Mud (Bauxite Residue)", published Mar. 1, 2017, Printed Feb. 9, 2023 (24 pages).

"Why Waste Waste? Red Mud can be commercially recycled on an industrial scale"—Accessed on Academia.edu on Feb. 5, 2023 (1 page).

Gary John McNeish, "Comment #4414715", thejournal.ie, Nov. 5, 2015 (1 page).

A Mar. 17, 2022, PCT International Search Report, that issued in the corresponding PCT/US 2021/060692.

A European Search Report issued on Apr. 6, 2023, that issued in the corresponding European Patent Application No. 20849364.3.

A Eurasian Office Action, dated Dec. 6, 2022, with an English Translation, that issued in Eurasian Patent Application No. 202290483.

Mishra Brajendra et al: "Materials sustainability for environment: Red-mud treatment" Frontiers of Chemical Science and Engineering, Higher Education Press, Heidelberg, vol. 11, No. 3, Jun. 24, 2017 (Jun. 24, 2017), pp. 483-496.

A Aug. 5, 2020 Chinese Office Action, without an English Translation, that issued in Chinese Patent Application No. 202080053967.X.

A Oct. 4, 2023 Indian Office Action, with an English Translation, that issued in indian Patent Application No. 202227001875.

Nov. 28, 2023 European Search Report, that issued in European Patent Application No. 20849364.3.

A PCT International Search Report, that issued in the corresponding PCT/US2021/060692.

PCT Written Opinion of The International Searching Authority, dated Mar. 17, 2022 which corresponds to International Application No. PCT/US2021/060692.

Jul. 22, 2024 United Arab Emirates Office Action, that issued in United Arab Emirates Application No. P6000174/2022.

* cited by examiner

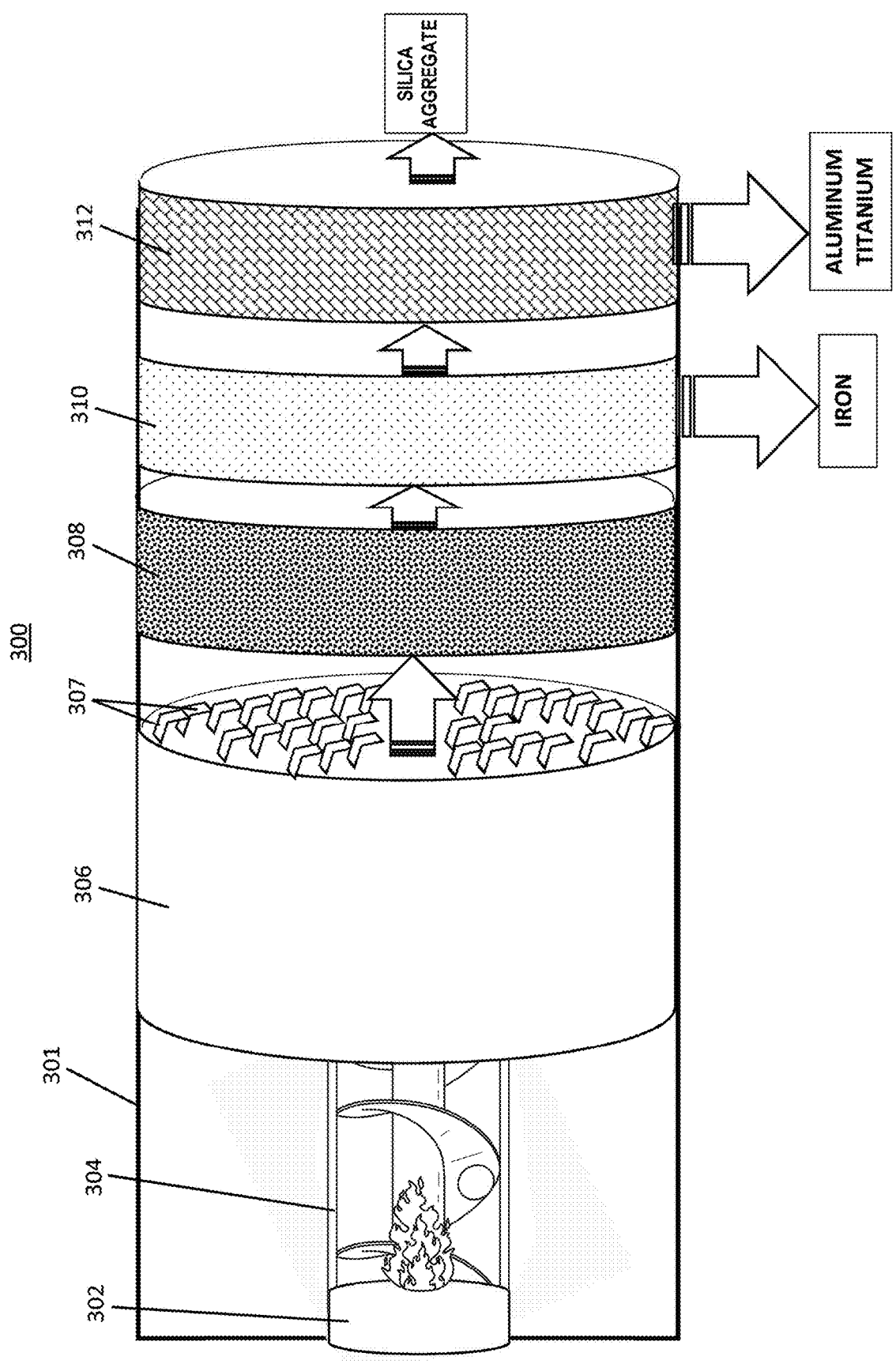

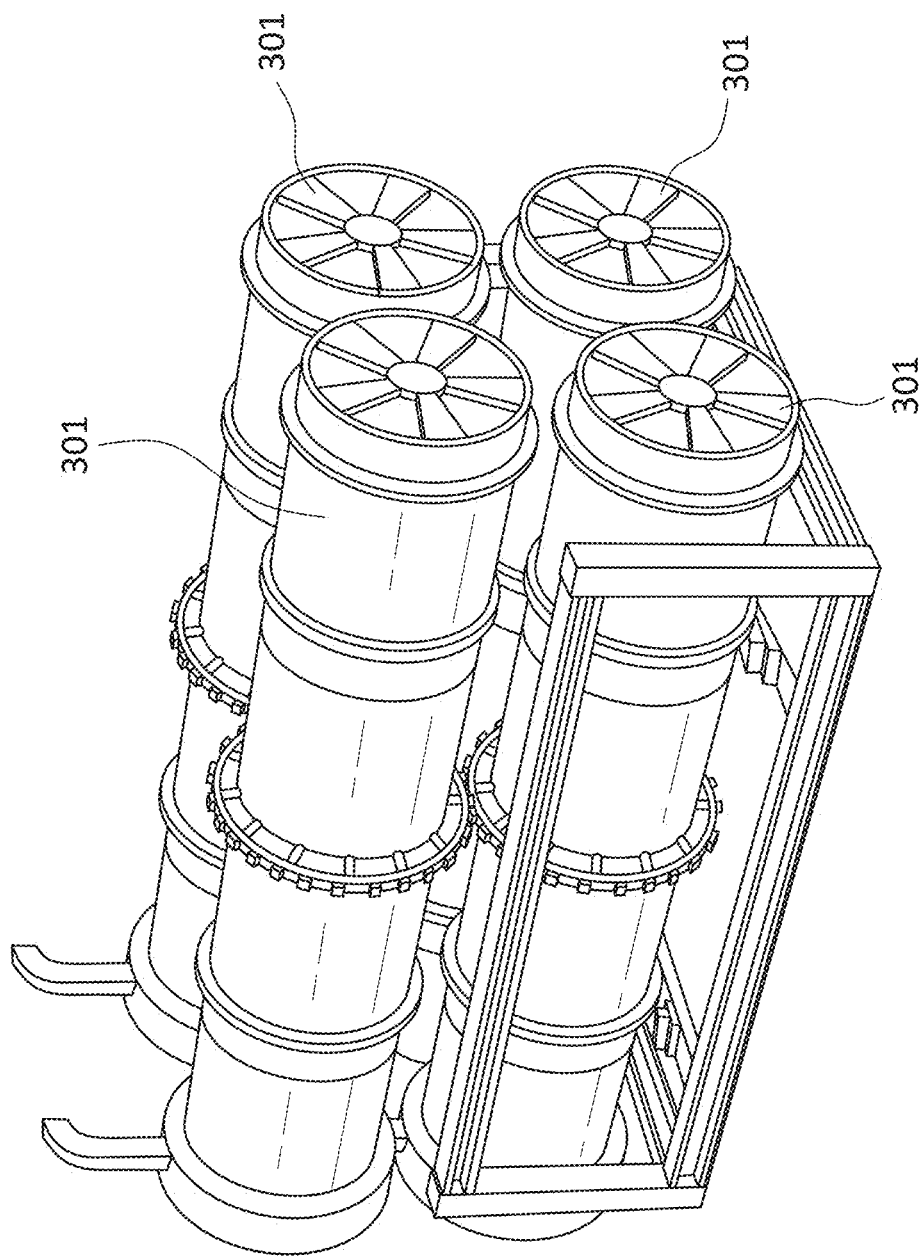

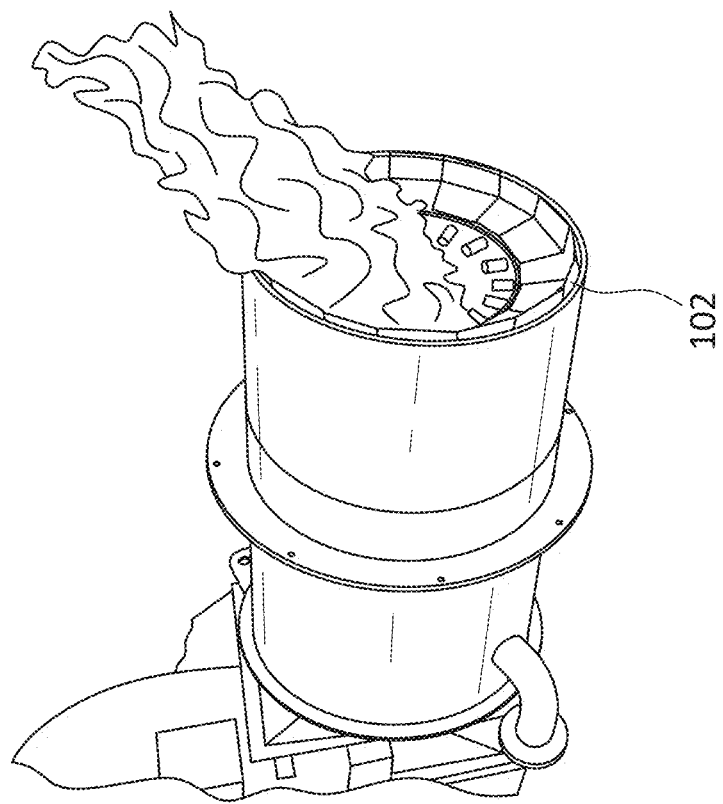
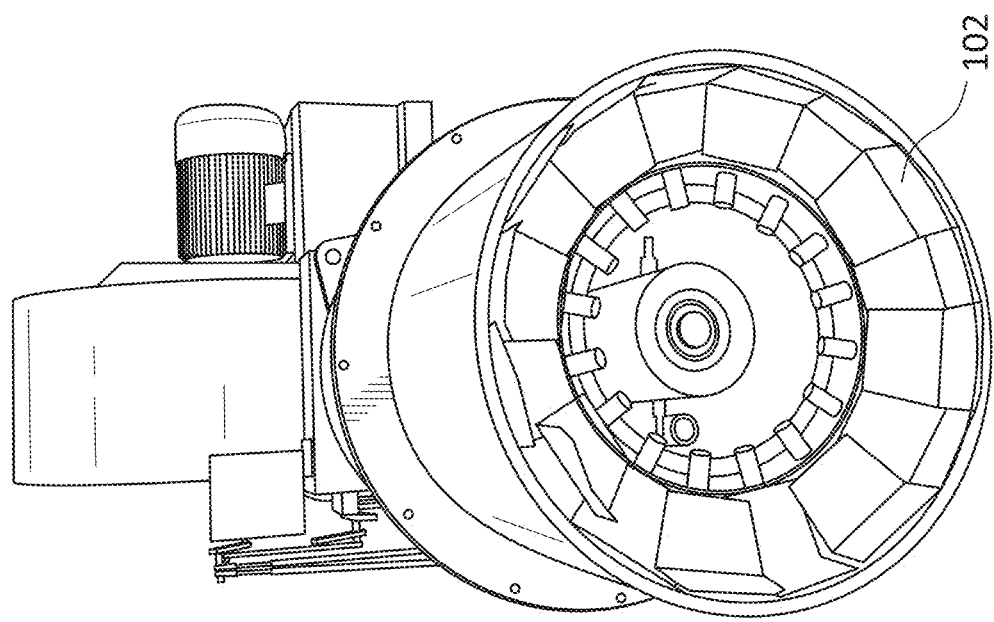
FIG. 4B
FIG. 4A

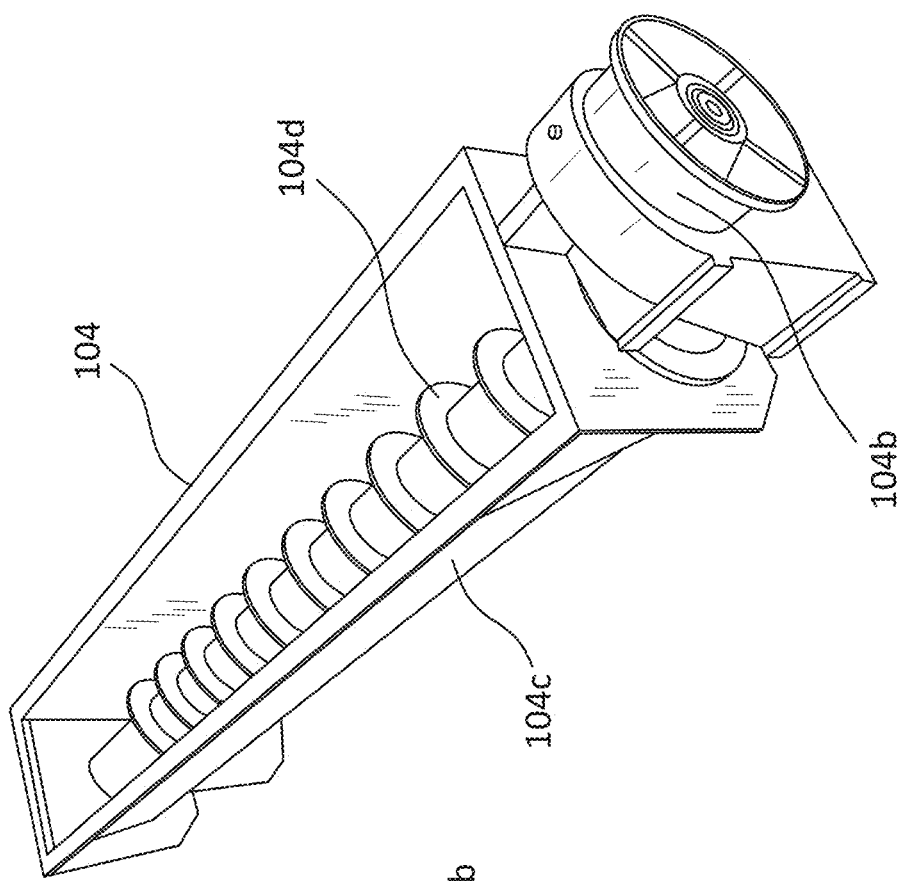
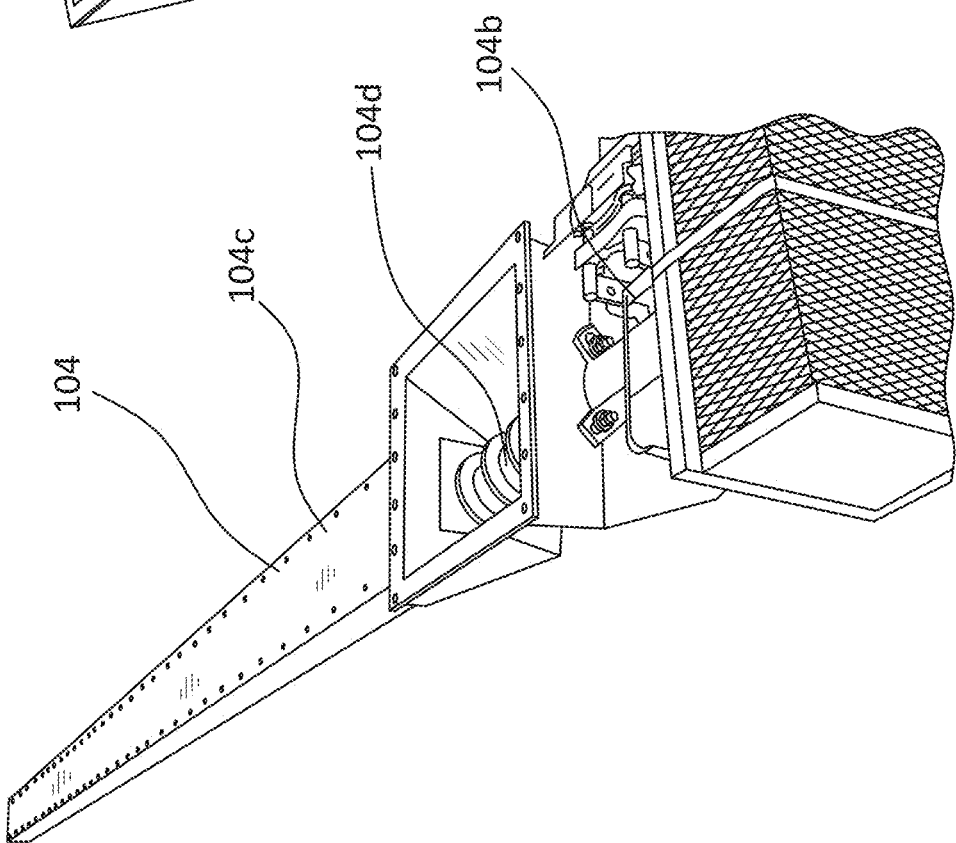

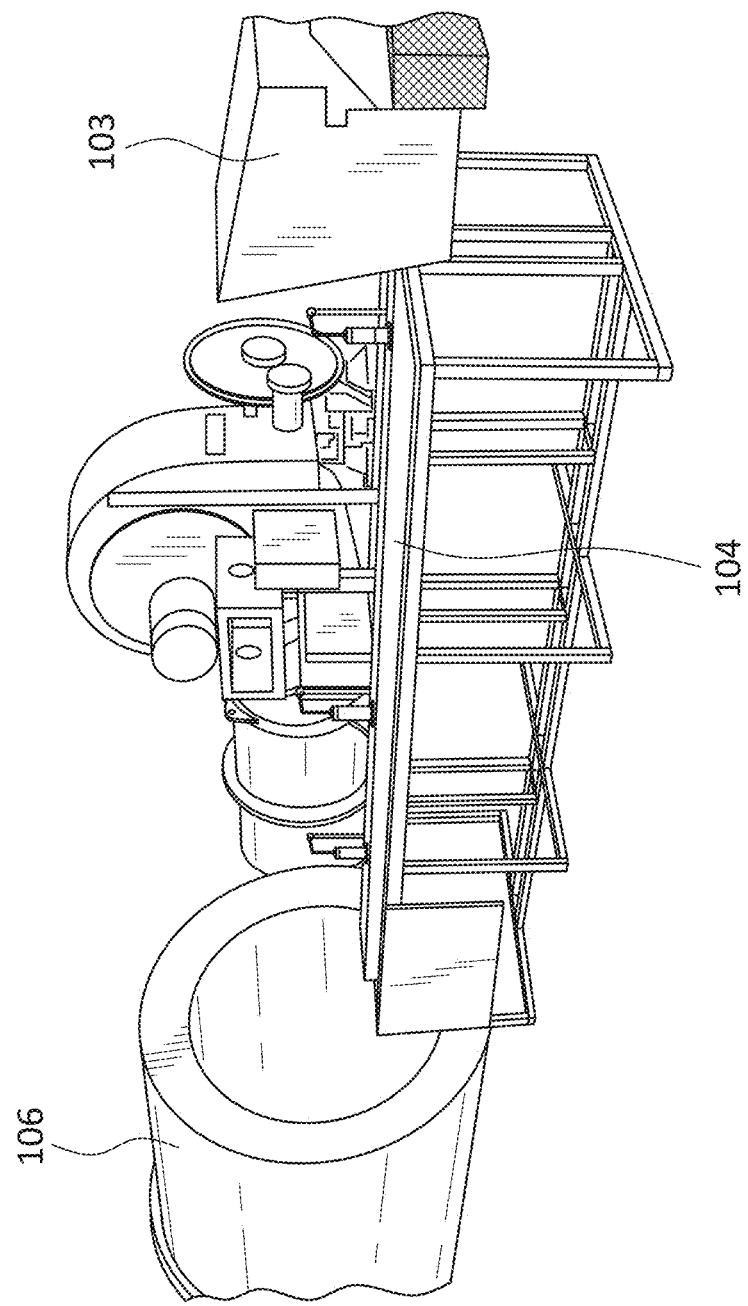

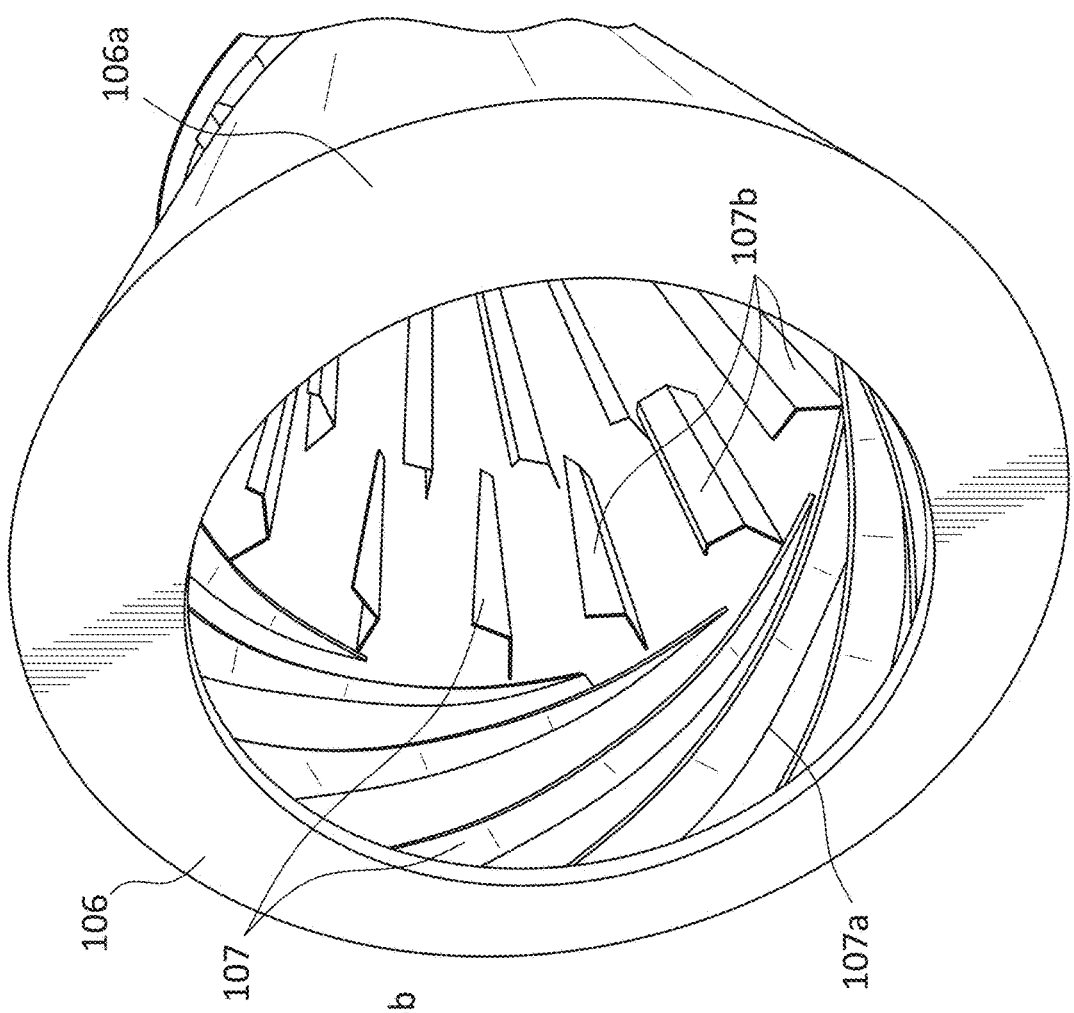
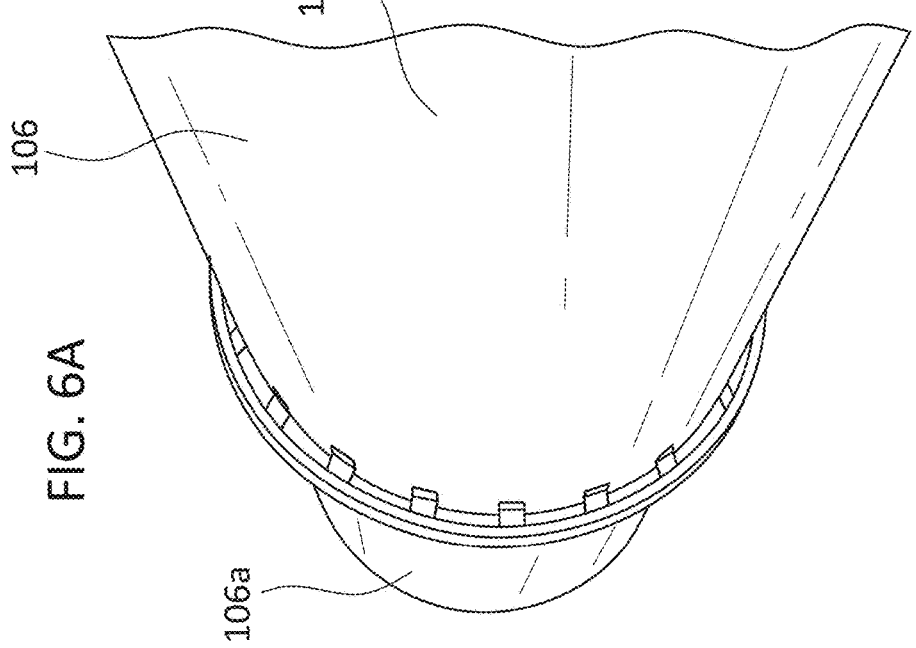

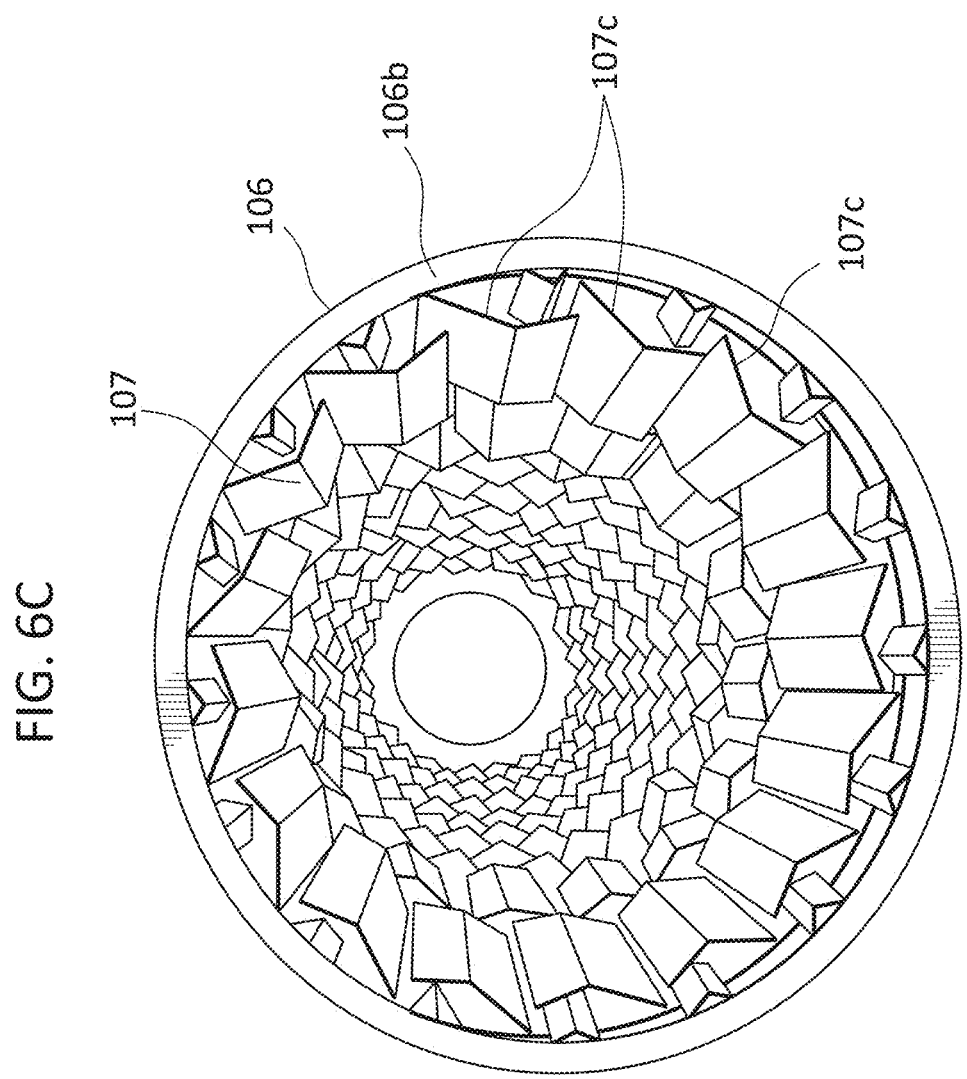

SYSTEM FOR PROCESSING RED MUD AND METHOD OF PROCESSING RED MUD

CROSS-REFERENCE TO RELATED APPLICATIONS

This application is a Continuation-In-Part application of U.S. application Ser. No. 16/533,232 filed on Aug. 6, 2019, the entire disclosure of which is incorporated herein by reference.

INTRODUCTION

Red Mud (RM) is an industrial waste produced by the alumina industry as a result of Bayer bauxite process for manufacturing aluminum. The alumina industry produces around 1.5 to 2 ton of RM for every ton of alumina. RM generated as a toxic byproduct, which has been considered technologically useless and has been stored in settling pools and toxic dumps around the world. There are over three billion tons of toxic RM stockpiled around the world and this amount grows daily.

RM has high alkalinity due to caustic soda content, which makes it highly corrosive, and contains heavy metals which are toxic to the environment. Typically, RM includes Na2O, Al2O3, Fe2O3, SiO$_2$, TiO2, and other materials in various amounts. For example, chemical analysis of RM located in France showed that RM included 14% of $Al_2O_3$, 11.5% of TiO2, 50% of $Fe_2O_3$, 6% of $SiO_2$, 5.5% of CaO and 3.5% of $Na_2O$. Another chemical analysis of RM located in China showed that RM included around 6.4-7.5% of $SiO_2$, 9.8-15% of $Al_2O_3$, 23.4-40.2% of $Fe_2O_3$, 3.9-37% of $CaSO_4$, 4.3-9.2% of $TiO_2$, 0.4-1.4% of $TiO_2$, 0.4-1.4% of $Na_2O$, 0.01-0.03% of MgO and 13.5-28% of Loss on Ignition (LOI) representing moisture and volatile materials. On a dry basis, RM typically contains 45-55% of iron oxides, 10-25% of aluminum oxide and approximately 10% of titanium oxide. As can be seen from the chemical analyses, aluminum, iron and to some extent titanium metals are present in RM in relatively high amounts. As a result, RM includes valuable metallic components therein, including aluminum, iron and titanium. However, due to the high alkalinity and toxicity of RM, extraction of these metals is difficult and requires addition of other toxic materials in order to chemically process RM for removal of one or more of these metals.

SUMMARY OF THE INVENTION

The present invention provides a method of processing RM which does not require addition of chemicals to RM in order to extract and recover aluminum, iron and titanium metals from RM. The present invention accomplishes recovery of these metals in high percentages, e.g., above 90% recovery, by using physical extraction and without chemically processing RM by adding further chemicals to react RM components. The method of the present invention is not complex and is adapted for processing large amounts of RM to produce environmentally safe components, thus rendering RM a non-hazardous material.

The present invention is directed to a system for processing red mud, the system comprising a first heating section controlled to heat red mud to a first temperature, a second heating section controlled to heat the red mud to a second temperature lower than the first temperature, a crusher configured to grind the red mud to a predetermined particle size, and one or more separators for physically extracting at least iron components and aluminum components from the red mud. In certain embodiments, the first temperature is at least 1200° C., and may be between 1400 and 2000° C., and the second temperature is between 600 and 1500° C. In some embodiments, the system includes a controller programmed to control the first heating section to heat the red mud to the first temperature and/or the second heating section to heat the red mud to the second temperature.

In certain embodiments, the first heating section includes an auger screw conveyor configured to convey the red mud along the first heating section and one or more burners configured to produce a flame within the first heating section. The second heating section may include a tube furnace having a plurality of fins along an inner surface thereof. In such embodiments, the tube furnace includes an inlet portion having a plurality of fins with a first arrangement on the inner surface thereof and an outlet portion having a plurality of fins with a second arrangement different from the first arrangement on the inner surface thereof. For example, the inlet portion includes a plurality of fins arranged without overlapping with one another and the outlet portion includes a plurality of fins each of which overlaps with another fin adjacent thereto.

In certain embodiments, the crusher comprises a ball mill and further includes a cooling section for cooling the red mud. The one or more separators include a magnetic separator configured to extract iron and iron oxides from the red mud. In some embodiments, the magnetic separator is further configured to extract titanium oxide from the red mud after extracting the iron and iron oxides. One or more separators may include a cyclone separator for separating at least aluminum from the red mud using gravity separation. The one or more separators are configured to separate the iron and aluminum components from the red mud without addition of chemicals to the red mud.

In some embodiments, the system includes a housing at least partially enclosing the first heating section, the second heating section, the crusher and at least one of the one or more separators. The housing may be in the form of a rotating tube furnace that includes a plurality of areas enclosing the first heating section, the second heating section, the crusher and the at least one or more separators.

The invention is also directed to a system for processing red mud comprising a heating section controlled to heat red mud to at least 1400° C., a crusher configured to grind the red mud to a predetermined particle size, and one or more separators for physically extracting at least iron and aluminum components from the red mud. In some embodiments, the heating section includes a burner controlled to heat red mud to a 1400-2000° C. The burner in the heating section may be a gasifier burner, a direct fired burner, a high thermal release burner and/or a cyclone burner. The heating section also includes an auger screw conveyor for conveying red mud along at least a portion of the heating section. The one or more separators include a magnetic separator for extracting at least iron and iron oxides from red mud and a cyclone separator for extracting at least aluminum from red mud using gravity separation. In certain embodiments, the one or more separators are configured to physically separate at least iron and aluminum from the red mud without addition of chemicals to the red mud.

In some embodiments, the system further comprises a housing at least partially enclosing the heating section, the crusher and at least one of the one or more separators. The housing may be in the form of a rotating tube furnace including a plurality of areas enclosing the heating section, the crusher and the at least one or more separators.

The present invention is also directed to a method of processing red mud. In some embodiments, the method comprises sanitizing red mud at a temperature of at least 1400° C. to remove caustic soda from the red mud, grinding the red mud to a predetermined particle size, and physically extracting at least iron components and aluminum components from the red mud. In some embodiments, the method comprises heating red mud to remove caustic soda from the red mud, grinding the red mud to a predetermined particle size, and physically extracting at least iron components and aluminum components from the red mud, wherein all of the processing is performed without adding chemicals to the red mud.

DESCRIPTION OF THE DRAWINGS

FIG. 3A shows another schematic configuration of the system for processing RM in accordance with the present invention;

FIG. 3B shows an exemplary arrangement of multiple housings of the system of FIG. 3A;

FIGS. 4A and 4B show photographs of the burner used in the systems of FIGS. 1 and 3;

FIG. 5A-D show photographs of the sanitizer used in the systems of FIGS. 1 and 3;

FIG. 5E shows a photograph of the sanitizer of FIGS. 5A-C used with a heating tube of FIGS. 1 and 3;

FIG. 6A-C show photographs of the heating tube used in the systems of FIGS. 1 and 3;

DETAILED DESCRIPTION

In the present invention, the processing of RM includes a heat process of heating the RM to very high temperatures, e.g., above 1200° C., and in certain embodiments, above 1400° C., in order to sanitize the RM and to remove toxic components such as caustic soda, a crushing process of crushing or ball milling the RM to a fine powder, e.g., 200 mesh, and a physical extraction process in order to extract metals, such as iron, aluminum and titanium from RM and to leave a non-hazardous silica aggregate. The heat process sanitizes the RM in order to render the previously toxic RM harmless and safe for the environment. The entire process of the present invention is performed without adding any chemicals to the RM, which allows the process to be performed wherever heat is available and avoids addition of toxic chemicals to an already toxic material. Moreover, since no chemicals are added to the process, no additional cleaning processing or disposal of chemical by-products is needed in order to produce non-toxic, environmentally safe materials as a result of the process of the present invention.

Figure 1:
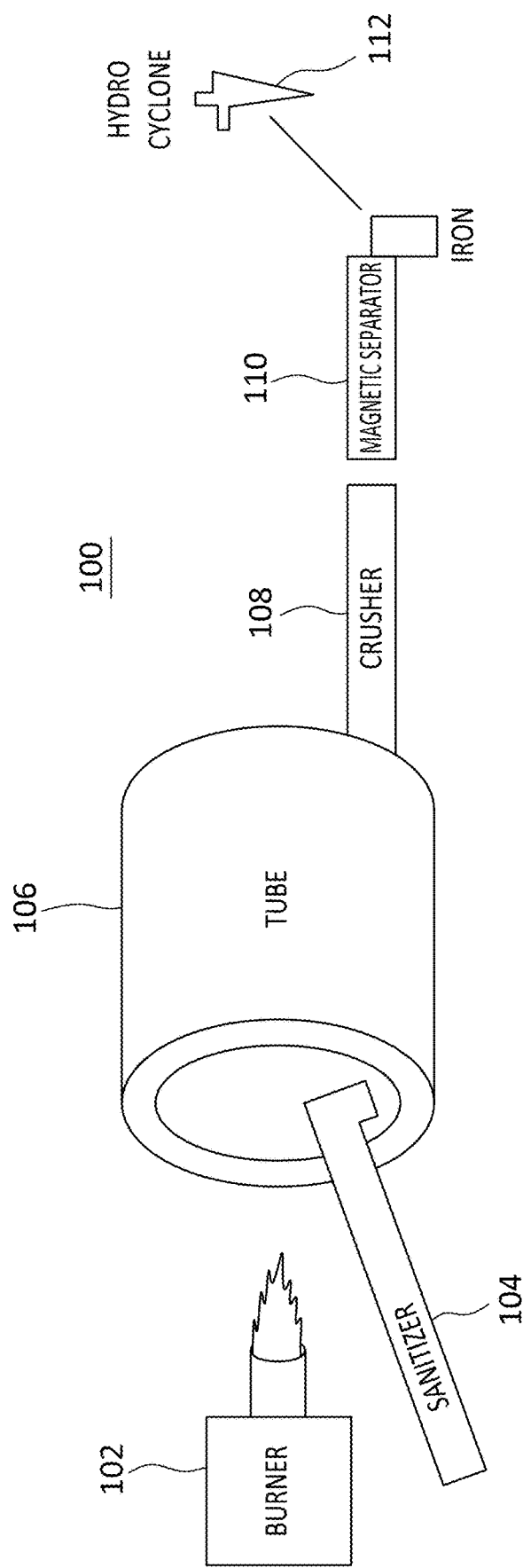
FIG. 1 shows a schematic configuration of the system for processing RM in accordance with the present invention.
Figure 2:
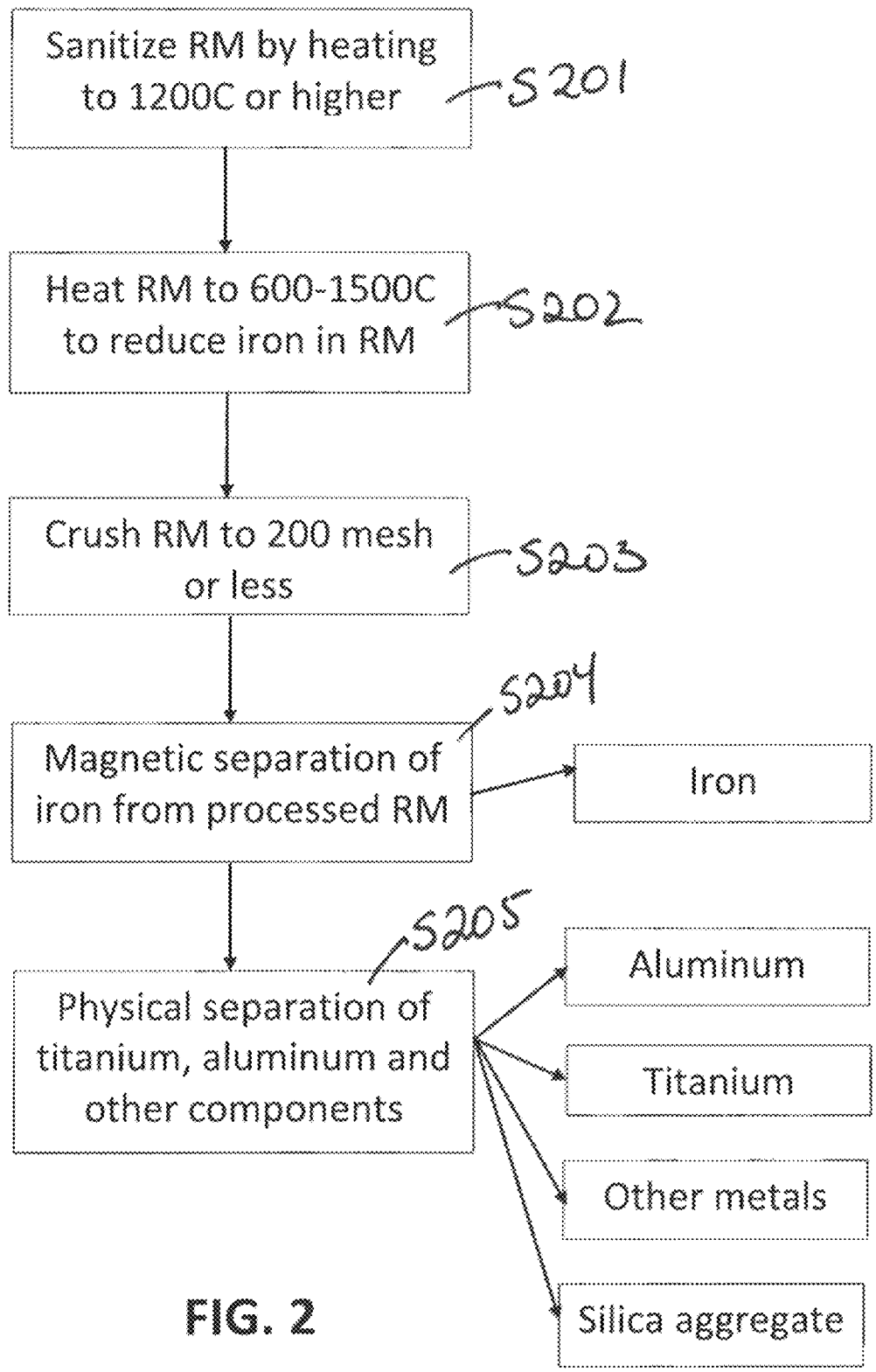
FIG. 2 shows a process of processing RM in accordance with the present invention.

FIG. 1 shows a schematic configuration of an exemplary system for processing RM in accordance with a first embodiment of this application, and FIG. 2 shows a flow chart of an exemplary method for processing RM using the system of FIG. 1 or using similar systems. As shown in FIG. 1, the system 100 includes one or more burners 102 for providing heat and a flame for the heat process, a sanitizer 104 in which RM is sanitized, a heating tube 106 in which the RM is further processed using heat, a crusher 108 for crushing the RM, a magnetic separator 110 for separating magnetic components from the processed and crushed RM, and a cyclone separator 112 for separating out the remaining components in the RM. The burner 102 may comprise a gasifier burner that uses biomass as fuel, a cyclone burner, a direct fired burner, a high thermal release (HTR) burner, an electric arc furnace, an induction furnace, or any other type of burner that operates on any fuel and which is capable of generating high heat of at least 1200° C., and preferably at least 1400° C. In certain embodiments, the burner 102 comprises a tube within a tube, wherein fuel, e.g., gas, is fed through an inner tube and is lit, while an outer tube supplies air for increasing the burning capacity of the burner 102. The inner tube may include a plurality of openings for receiving the air supplied by the outer tube. The size of the burner 102 may vary so that the burner may have a small or a large bore size, and may have a small or a large length in order to provide the heat required for heating the RM to the temperature above 1400° C.

An exemplary burner 102 that may be used in the system of FIG. 1 is shown in FIGS. 4A and 4B, which show a burner/gasifier. In FIG. 4A, the burner 102 is turned off while in FIG. 4B, the burner is operating and is generating a flame to which the RM would be exposed. An exemplary burner 102 used in the system may be a Hauck® Eco-star II burner, which is a packaged low NOx multi-fuel burner. Any other burner capable of heating to temperatures of 2000 C is suitable for the system of the present invention. In addition, the size of the burner may be varied depending on the amount of RM to be processed and the size of the system 100. In certain embodiments, the burner 102 may be an existing burner manufactured by another company, e.g., Hauck®, and may be customized for use in the system 100. For example, certain piping, including outlet piping, may be removed from the burner in order to make the burner more compact and to fit the piping of the system. In addition, the burner 102 may be customized so as to require 110V of power for operation in order to limit the size of the generator and to allow for global operation in any area of the world. In certain illustrative embodiments, the burner 102 needs a 5-7 kW generator for operation. For example, the above-mentioned Hauck® Eco-star II burner uses a 3-phase motor to supply air thereto, and in some embodiments, this burner may be modified to replace the 3-phase motor and corresponding air supply equipment with different, more cost-effective equipment, such as a leaf blower, a leaf blower motor and/or a fan. Other types of burners may be similarly customized in order to operate with 110V power and to be more cost and energy effective.

In certain embodiments, the burner 102 generates a flame so that the RM is exposed to the flame while being heated. In some embodiments, a plurality of smaller or same size burners or flame sources may be provided along the sanitizer 104, which may be used in addition to or instead of the main, larger sized, burner. The plurality of smaller burners may include, but are not limited to, high temperature weed burners capable of heating to 2000° C. In an illustrative embodiment that uses the sanitizer 104 shown in FIGS. 5A-E, described below, the plurality of burners provide heat and direct flame into the sanitizer 104 without requiring a larger sized burner for the sanitizer 104.

Fuel used for the burner(s) to generate the flame and heat and to heat the RM to 1200° C. or higher, and preferably, top 1400° C. or higher includes any source of heat, such as gas, biogas, syngas, biomass, electricity, coal, coal powder, microwave, processed sewage pellets (PSP), used oil, plasma, waste products from wood processing companies, e.g., sawdust or pellets, corn husk, nut shells, straw, wood, agricultural waste or a combination of these fuels.

Figure 5B:
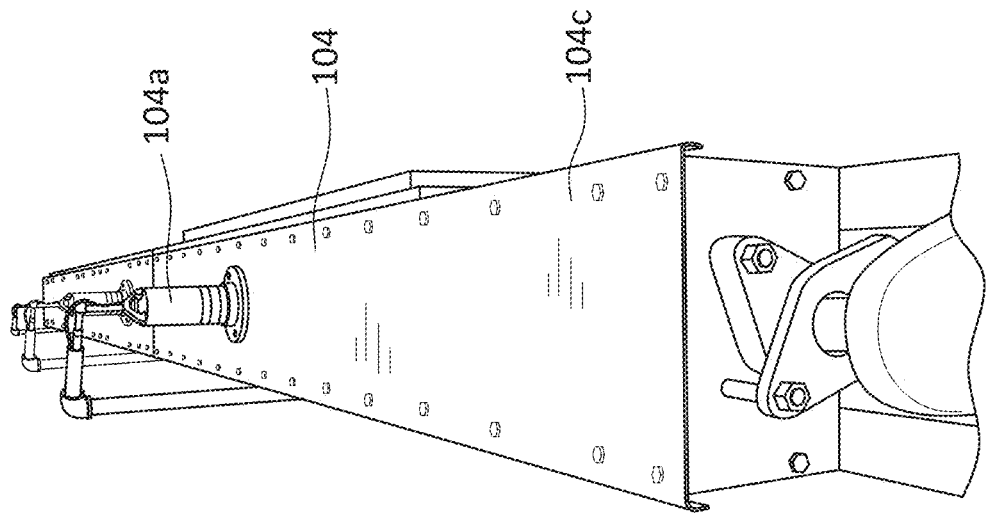
Figure 5A:
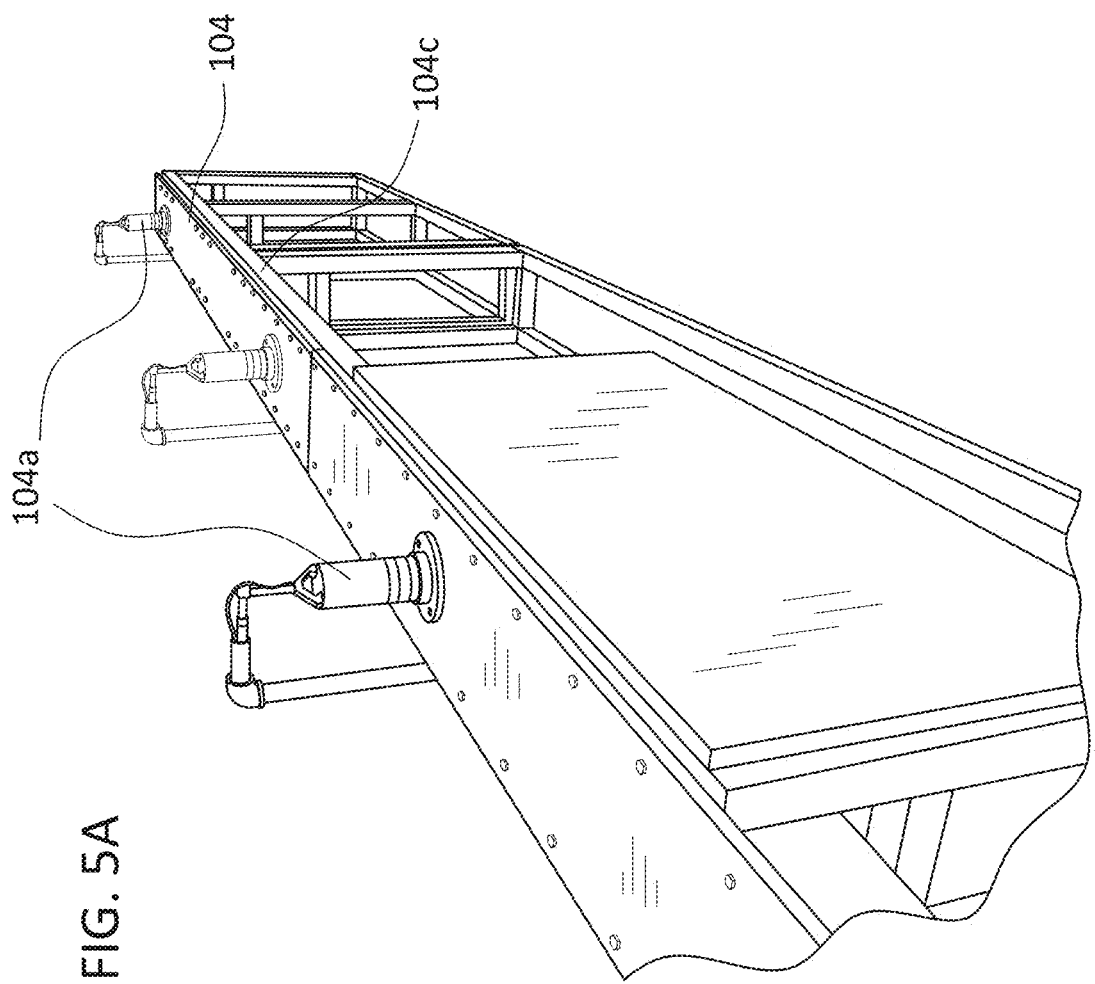

The sanitizer 104 includes an auger screw conveyor or a similar conveyor for conveying the RM to the sanitizer 104, along the sanitizer 104 and from the sanitizer to the next processing stage, while the RM is exposed to high heat from the burner 102. The sanitizer 104 receives RM preferably after it has been dried to a moisture content of less than 30% using filtration and/or pre-heating, or any other suitable method. Typically, RM is stored dry in ponds using dry stacking, and thus, RM may be supplied directly from the ponds to the sanitizer 104 of the system 100. While the RM is conveyed using the auger conveyor, the RM is heated to very high temperatures and exposed to the flame generated by the burner 102 and/or by the supplemental burner(s). An exemplary configuration of the sanitizer 104 of this invention is shown in FIGS. 5A-E. FIGS. 5A-B show a frame, which holds the auger screw conveyor (visible in FIGS. 5C-D) covered by an enclosure and which includes three smaller supplemental burners 104a. The auger screw conveyor is driven by a motor (visible in FIG. 5C) connected at the end 104b of an enclosure 104c that houses the auger screw conveyor and that holds the RM as it is conveyed through the sanitizer. In FIG. 5C, the auger screw conveyor 104d provided in the enclosure 104c is shown without the frame, and an opening in the enclosure 104c exposes a portion of the auger screw conveyor 104d provided therein. FIG. 5D shows a schematic rendering of the auger screw conveyor 104d with a portion of the enclosure removed so as to expose the auger screw conveyor 104d. FIG. 5E shows the sanitizer 104 attached to a hopper 103 that supplies the RM to be processed to the sanitizer 104, and the sanitizer 104 is positioned adjacent the heating tube 106 which receives sanitized RM from the sanitizer 104. When the system 100 of the present invention is assembled, the sanitizer 104 or an end portion thereof that fluidly connects with the heating tube 106 may be enclosed by a housing (not shown) so as to contain the RM being processed.

Although the illustrative embodiment of the sanitizer 104 in FIGS. 5A-E uses the auger screw conveyor for the sanitizer, in other embodiments, the RM may be gravity fed through the sanitizer instead of the auger screw conveyor. In yet other embodiments, a cyclone may be formed within the sanitizer by the flame produced by the burner, and the cyclone may be used together with the auger screw conveyor or may be used instead of the auger screw conveyor. In some embodiments, a fluid bed system may be used for sanitizing the RM. Moreover, the size and dimensions of the sanitizer may be varied depending on the site requirements and amount of RM to be processed. In some embodiments, multiple sanitizers 104 having the same or different configurations may be used and the sanitizers may be connected in series or in parallel.

In the sanitizer 104, the RM is heated to at least 1200° C., and preferably to 1400° C. In certain embodiments, the RM is heated to a temperature within a range of 1400-2000 degrees C. The RM is preferably exposed to this temperature for up to 5 minutes. Exposure of RM to the flame and heating RM to the temperature of 1400° C. or higher converts silica components in the RM to glass and eliminates caustic soda from the RM. As a result, RM output from the sanitizer is non-hazardous and is pH neutral or around pH neutral. In addition, the exposure of RM to the flame and heat may reduce of some or all of iron in the RM.

By using the auger conveyor or a similar conveyor that conveys RM along the sanitizer while stirring or agitating the RM, all of the RM particles are evenly exposed to the heat from the flame(s) so as to eliminate or substantially eliminate caustic soda in the RM and to convert the silica components in the RM to glass. In addition, exposing the RM to the flame of the burner(s) 102 causes the particles or grains of the RM to separate and ensures that each RM particle or grain is exposed to the flame so that each particle or grain of RM reaches the desired temperature of at least 1200° C., and preferably in the range of 1400-2000° C. Furthermore, using an auger or similar conveyor allows the system 100 to be used continuously to process RM on an on-going basis so as to allow processing of large amounts of RM.

In certain embodiments of the system 100, the burner 102, similar to the one shown in FIGS. 4A-4B, includes a tube or an output port from which the flame comes out during its operation. In such embodiments, the sanitizer 104 may be formed by extending this flame output port of the burner 102 and installing the auger screw conveyor inside the extended output port which acts as the enclosure for the auger screw conveyor. In this configuration of the sanitizer 104, RM is introduced by the auger conveyor into the extended output port either near the end close to the flame or at the end further away from the flame. In either case, the flame within the extended output port and the incoming air will generate a cyclone so as to cause movement or agitation of the particles or grains in the supplied RM. As a result, the RM particles or grains are separated as they hit the flame and each individual particle or grain reaches the desired temperature of at least 1200° C., and preferably, 1400-2000° C.

After the RM undergoes heat processing in the sanitizer 104, the RM is conveyed into the heating tube 106 to undergo a second heating process at a lower temperature. This second heating process is a calcining process. In certain embodiments, the RM is supplied by the auger conveyor from the sanitizer 104 to the heating tube 106, where the RM cools and is kept at a temperature between 600 and 1400° C. In some embodiments, the temperature in the heating tube 106 is between 800 and 1500° C. The heating tube 106 in this illustrative embodiment comprises a rotating tube furnace or a similar furnace. Alternatively, a cement calcinatory tube furnace or any other furnace may be used as the heating tube 106 in the system 100. During the second heating process, the RM is further processed so as to complete the conversion of silica to glass, if necessary, and to reduce the iron and iron oxides in the RM to obtain metallic iron (Fe) and a range of iron oxides. Specifically, the two-step heating process in the sanitizer 104 and the heating tube 106 reduces iron compounds in the RM to iron oxides, including hematite ($Fe_2O_3$) and magnetite ($Fe_3O_4$), and to metallic Iron (Fe). Depending on the iron and iron oxide content of the RM being processed, the resulting processed RM includes metallic iron (Fe) and various amounts of hematite ($Fe_2O_3$), goethite (FeO) and magnetite ($Fe_3O_4$).

In order to ensure complete processing of RM and substantial reduction of iron in the RM during the second heating process, the heating tube 106 of the present invention comprises a rotating tube furnace or a rotating heating furnace, which, in certain embodiments, includes a plurality of fins or baffles for ensuring thorough processing of the RM. An exemplary heating tube 106 is shown in FIGS. 6A-C. FIG. 6A shows a photograph of a portion of the heating tube 106 and FIGS. 6B-C show opposing openings of the heating tube which illustrate the fin structure provided within the tube. As shown in FIGS. 6B-C, the heating tube 106 includes an outer surface and an inner surface, and a plurality of baffles or fins 107 provided along the inner surface of the tube. In the illustrative embodiment of the heating tube, FIG. 6B shows an inlet opening of the heating tube 106 and FIG. 6C shows an outlet opening of the heating tube 106. In other embodiments, these openings may be reversed, or the inlet and outlet openings may have the same or substantially the same configuration with substantially the same fins and arrangement thereof.

In some embodiments, the heating tube 106 includes a first section 106a, which opens to the inlet of the heating tube, and a second section 106b, opening to an outlet of the heating tube. The first and second sections 106a, 106b have different fins 107 and different fin arrangements therein. As shown in FIG. 6B, the first section has a plurality of rib-like fins 107a arranged in an angled thread-like pattern on the inner surface of the heating tube 106. Following the rib-like fins 107a in a direction towards the outlet of the heating tube 106, a plurality of chevron-shaped fins 107b are provided around the inner surface of the heating tube 106. Each of the chevron-shaped fins 107b is attached to the inner surface of the heating tube 106 at one end, while the other end of the fin 107b is unattached. The chevron-shaped fins 107b are substantially evenly spaced from one another around the circumference of the inner surface an in the first section, these fins 107b do not overlap with one another. The spacing between the fins 107b may be varied and is not limited to the spacing shown in FIG. 6B. Moreover, the spacing of the fins 107b may vary along the length of the first section 106a so as to increase or decrease the spacing between adjacent fins 107b along the length of the first section 106a and in the direction toward the second section 106b. Additionally, the chevron-shaped fins 107b may be provided in a plurality of rows along the length of the first section 106a, wherein the fins 107b in adjacent rows may be aligned or may be shifted relative to one another.

FIG. 6C shows the configuration and arrangement of the fins 107c in the second section 106b of the heating tube 106. As shown, in the present illustrative embodiment, each fin 107c in the section 106b has a chevron shape with two plate portions angled with respect to one another. However, the chevron-shaped fins 107c in the second section 106b are placed at a different angle relative to the inner surface of the tube 106 than the chevron-shaped fins 107b in the first section 106a. In some embodiments, one of the plate portions may be longer than the other plate portion in each fin 107c, whereas in other embodiments, the plate portions may have substantially the same length. The fins 107c are arranged around the inner surface of the tube so that one plate portion of each fin is attached to or coupled with the inner surface of the tube 106 while the other plate portion is unattached and slightly overlaps with an attached plate portion of an adjacent fin. While adjacent fins in the present embodiment slightly overlap with one another, in other embodiments, the fins may be spaced further apart so that they do not overlap with one another or may be spaced closer together to provide a greater overlap. Moreover, as can be seen in FIG. 6B, the fins 107c are arranged in a plurality of rows along the length of the tube 106, with adjacent rows being offset by a predetermined distance, e.g., ⅓ or ½ of the width of the fin.

The configuration of the fins and their arrangement within the tube 106 facilitates desired mixing and agitating of RM within the tube while the tube 106 is rotated. As a result, all particles or grains of RM are exposed to the heat and are heat processed within the tube 106. By changing the arrangement and configuration of the fins along the length of the tube, agitation and mixing of the RM within the tube is controlled so as to provide more agitation and mixing in certain areas, e.g., within the area of chevron-shaped fins 107b of the first section, as compared to other areas of the tube.

During operation, the heating tube 106 rotates and supplies heat so as to maintain a temperature above 600° C., or within a predetermined temperature range, e.g., 600-1400° C. or 800-1500° C. or 600-1500° C. The temperature within the heating tube 106 may be manually or automatically controlled using a thermocouple to sense the temperature in the heating tube 106. The RM supplied to the heating tube 106 cools down from the temperature of 1200° C. or higher to 600-1500° C. when the RM particles hit the fins 107a and the inner sidewalls of the heating tube 106. Moreover, the air intake together with the input RM and the rotation of the heating tube 106 creates a cyclone or gas movement within the heating tube 106 so that the RM particles or grains are exposed to the heat and all or substantially all of the iron in the RM is reduced. Although not shown in the Figures, in certain embodiments a burner, such as the burner shown in FIGS. 4A-4B, may be used with the heating tube 106 in order to create a cyclone and to facilitate movement of the particles within the tube 106.

In the illustrative example of the heating tube 106 shown in FIGS. 6A-C, the heating tube 106 is 90 feet in length and 8-10 feet in diameter, and includes two sections that have a plurality of fins having different arrangement. In other embodiments, the fins may have the same shape and may be arranged in the same manner throughout the heating tube, or the fins may have the same shape and be arranged differently between two or more sections. Additional sections with the same or different arrangement of the fins, or without any fins, may be provided in the heating tube. In other embodiments, the length of the heating tube may be varied to be shorter or longer, depending on the arrangement and requirements of the system, the surroundings and the requirements of the site. The diameter of the heating tube may also vary, particularly depending on the amount of RM being processed. In certain embodiments, the length of the heating tube 106 is 40-50 feet and the diameter of the heating tube 106 is 8-10 feet. In addition, the fins shown in FIGS. 6A-C may be omitted in some heating tubes or in some sections of the heating tube, and in some embodiments, other mixing or stirring techniques may be used. In some embodiments, multiple heating tubes may be used and may be arranged in parallel or in series, and the heating tubes may have the same or different configurations. For example, a plurality of heating tubes 106 having substantially the same configuration may be arranged in parallel and may be rotated using the same motor or using separate motors in order to cost-effectively provide higher capacity for processing RM. Furthermore, although FIGS. 1 and 6A-6C show the heating tube 106 being arranged horizontally, in other embodiments, the heating tube 106 may be arranged vertically, as long as the heating tube can heat the RM to the required temperature.

Although not shown in FIG. 1, the temperature in the sanitizer 104 and/or the heating tube 106 may be controlled by a controller programmed to receive information regarding temperature sensed in the sanitizer 104 and/or the heating tube 106 and to adjust the one or more burners 102 and/or the heating tube 106 to supply more or less heat based on the received information. The controller may include one or more processors or circuits for performing the above control functions.

Following the heat processing in the sanitizer 104 and the heating tube 106, the processed RM includes magnetic iron oxides ($Fe_2O_3$, FeO and $Fe_3O_4$), some magnetic iron (Fe), and a mixture of non-magnetic aluminum, titanium and silicon oxides with traces of other oxides. Processed RM was analyzed using X-ray diffraction to determine its components. Tables 1 and 2 show the results of this analysis on processed RM samples RM1 and RM2.

TABLE 1

Sample RM1

| Compound Name | Formula | System | S-Q |
|---|---|---|---|
| Nepheline (Na-exchanged) | Na6.65Al6.24Si9.76O32 | Hexagonal | 34.5% |
| Magnetite, syn | Fe3O4 | Cubic | 15.6% |
| Hercynite, syn | FeAl2O4 | Cubic | 12.8% |
| Goethite, syn | FeO(OH) | Orthorhombic | 9.1% |
| Alumina\|Aluminum Oxide | Al2O3 | | 8.0% |
| Wustite, syn | FeO | Cubic | 7.9% |
| Aluminum Oxide | Al2O3 | Monoclinic | 6.4% |
| Quartz | SiO2 | Hexagonal | 5.7% |

TABLE 2

Sample RM2

| Compound Name | Formula | System | S-Q |
|---|---|---|---|
| Cancrinite, syn | Na8(Al6Si6O24)(OH)2.04(H2O)2.66 | Hexagonal | 24.4% |
| Hematite | Fe2O3 | Rhombo.R.axes | 20.7% |
| Clinoferrosilite, syn. | FeSiO3 | Monoclinic | 14.6% |
| Anatase, syn | TiO2 | Tetragonal | 12.9% |
| Quartz | SiO2 | Hexagonal | 11.8% |
| Boehmite, syn | AlO(OH) | Orthorhombic | 8.4% |
| Gibbsite | Al(OH)3 | Monoclinic | 7.1% |

Although FIG. 1 shows a system in which the burner 102 and sanitizer 104 are used for the first heating stage and the heating tube 106 is used for the second heating stage, in other embodiments the second heating stage using the heating tube 106 may be performed prior to performing the first heating stage using the burner 102 and sanitizer 104. In yet other embodiments, the second heating stage may include multiple calcining stages which are performed using separate heating tubes similar to the one described above, or performed using the same heating tube configured to include multiple stage processing. In further embodiments, the two heating stages may be combined so that a single heating stage is performed. In such embodiments, the RM is heated to at least 1200° C., and preferably to 1400-2000° C. and exposed to one or more flames using the burner(s) 102 while being conveyed through the heating tube 106 which rotates so as to facilitate thorough processing of the RM to remove toxic components, such as caustic soda, to convert silica components to glass and to reduce iron components to metallic iron (Fe) and a range of iron oxides. In such embodiments, the auger screw conveyor may be omitted, or the auger screw conveyor may be used within the heating tube 106 to convey the RM to the heating tube 106 and/or to convey the RM through at least a portion of the heating tube 106.

Moreover, in some embodiments, the burner 102 and sanitizer 104 and/or the heating tube 106 may be arranged following the crusher 108 described in more detail below. However, in the illustrative embodiment of FIG. 1, the crusher 108 is arranged following the heating tube 106, so that the crusher 108 receives processed and non-hazardous RM. The crusher 108 may include ball milling using steel or any other suitable balls, or any other type of grinding equipment suitable for milling or grinding dry powder. In the present embodiment, the processed RM may be cooled before being supplied to the crusher 108 using heat exchangers, atmosphere or any other suitable cooling means, such as quenching in water or other cooling liquid. In certain embodiments, heat may be recovered from the processed RM during the cooling process and used internally for heating RM supplied to the system or externally for other purposes, e.g., heating water.

Figure 7:
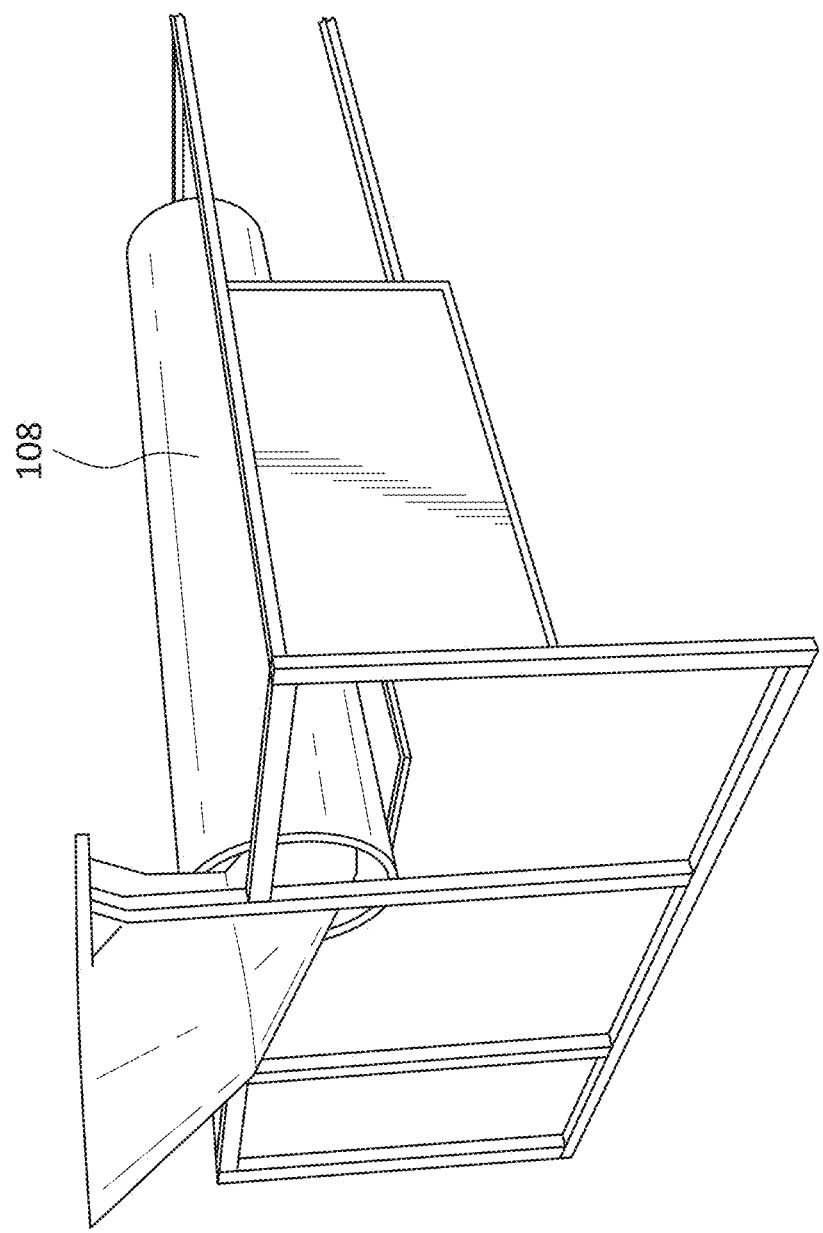
FIG. 7 shows an exemplary magnetic separator used in the systems of FIGS. 1 and 3.

Once received by the crusher 108, the cooled processed RM is milled to a 200 mesh particle size or smaller. The milling of the processed RM separates the particles of iron and iron oxides from other metallic oxides that are not reduced during the heating processes. As a result, the milled processed RM powder can be physically separated into its components in a dry state. An exemplary crusher 108 is shown in FIG. 7, which is a ball milling crusher.

After the processed RM is milled in the crusher 108, the RM is received in the magnetic separator 110 for magnetically separating iron and iron oxides produced during the processing. Specifically, existing magnetic separation machinery may be used to extract magnetic materials from the processed RM, including iron and iron oxides. In some embodiments, depending on the intensity of the magnetic field set in the magnetic separator 110, Titanium oxide(s) may also be magnetically extracted in addition to iron and iron oxides. Such magnetic extraction of titanium oxide(s) may be performed as a separate magnetic separation stage after magnetically separating the iron and iron oxides. In certain embodiments, multiple magnetic separators 110 for separating iron and iron oxides and/or for separating titanium oxide(s) may be used and these separators may be connected in parallel or in series. Magnetic separation of iron and iron oxides extracts more than 90% of the iron/iron oxides present in the processed RM, and in particular, about 96% to 100% of iron/iron oxide content. In addition, magnetic separation results in superior products containing concentrated iron oxide, which is easy and economical to use directly for production of steel, in electric arc furnaces and other uses.

After magnetically extracting magnetic components (iron, iron oxides and in some embodiments, titanium oxides) from the processed RM powder, the remaining RM is provided to a cyclone separator 112 for separating the remaining non-magnetic components in the RM, including aluminum and titanium oxides based on their weight. The cyclone separator 112 uses gravity separation in order to separate out aluminum oxide and titanium oxide from the final residue that includes mainly silica components. In some embodiments, the cyclone separator 112 is a hydrocyclone, while in other embodiments the cyclone separator is another type of vortex or gravity separator, including but not limited to conventional jigs, pinched sluices, spirals, centrifugal jigs, shaking tables, floatation devices, etc. In certain embodiments, multiple cyclone separators or gravity separators may be used in parallel or in series in order to increase capacity and/or to complete the separation.

Gravity separation using the cyclone separator 112 results in separation of aluminum oxide and titanium oxide from the magnetically separated RM, leaving a silica residue including silica components and other minor elements. This silica residue may be used in construction and brick, concrete or cement manufacturing.

As discussed above, the system 100 of FIG. 1 is capable of processing RM to render it non-hazardous to the environment and efficiently recycling valuable RM components without adding chemicals to the RM. The method of processing RM using the system of FIG. 1 or any other suitable system, is shown in FIG. 2.

As shown in FIG. 2, the process includes a sanitizing step S201 of heating the RM to 1,200° C. or higher, and preferably to 1400° C. or higher, in order to sanitize the RM so as to remove toxic components such as caustic soda and to convert silica to glass. The sanitizing step S201 may be performed using the burner(s) 102 and sanitizer 104 of the system in FIG. 1.

After the sanitizing process in step S201, the RM is then further heat processed in a calcining step S202, in which the RM is heated to 600° C. or above, and preferably to 600-1500° C., or 600-1400° C., or 800-1500° C. temperature range. During the calcining step S202 the iron components of RM are reduced so as to produce metallic iron (Fe) and a variety of iron oxides as discussed above. The calcining step S202 may be performed in the heating tube 106 of the system of FIG. 1.

After calcining the RM in step S202, the processed RM is crushed or milled to a fine powder of about 200 mesh and preferably 200 mesh or smaller in a milling step S203. The missing step S203 may be performed using the crusher 108 of the system of FIG. 1.

Although FIG. 2 shows the sanitizing step S201 being performed first, followed by the calcining step S202 and followed by the milling step S203, in other embodiments, the calcining step S202 may be performed before the sanitizing step S201, and in yet other embodiments, the milling step S203 may be performed before one or more of the sanitizing step S201 and the calcining step S202. The order of step S201-S203 may be varied depending on the needs of the processing, the equipment used and the condition of the RM. The arrangement of the system components in FIG. 1 may similarly be varied, depending on the order of the steps S201-S203 being performs. After steps S201-S203 are performed, the resulting processed RM comprises a non-toxic, non-hazardous to the environment fine powder that includes iron, iron oxides, aluminum oxides, titanium oxides, quartz and/or silica compounds, as discussed above with respect to FIG. 1.

This processed RM is subjected to magnetic separation of iron and iron oxides in a magnetic separation step S204 so as to output iron and iron oxide materials. The iron and iron oxides recovered in the magnetic separation step S204 may be compressed into bricks or briquettes which may then directly be directly used for steel production in electric arc furnaces. The magnetic separation step may be performed using the magnetic separator 110 in the system of FIG. 1.

Although not shown in FIG. 2, in certain embodiments, the magnetic separation step S204 may further include a second magnetic separation process using a high intensity magnetic field so as to remove titanium oxide from the processed RM. This second magnetic separation step may be performed after magnetically extracting the iron and iron oxides from the processed RM, or after removing the aluminum from the RM in step S205 described below. The second magnetic separation step may be performed using the same magnetic separator used for separation of iron and iron oxides with higher intensity settings, or may be performed in a separate magnetic separator.

Following the magnetic separation step S204 of separating iron and iron oxides, the remaining RM undergoes physical separation in step S205 to separate aluminum, silica and titanium using gravity separation. As discussed above, the aluminum, titanium, and other metal components may be separated out based on weight using a cyclone separator or another type of gravity separator. The cyclone 112 of FIG. 1 may be used for performing step S205. The physical separation step may separate out the aluminum oxide particles and separately, the titanium oxide particles. Alternatively, the physical separation step S205 may separate out the aluminum oxide and titanium oxide particles, leaving a silica aggregate with minor components, and thereafter the separated aluminum and titanium oxides are subjected to high intensity magnetic separation to extract titanium oxide.

The silica aggregate produced by the physical separation step S205 or by the combination of the physical separation step S205 and high intensity magnetic separation, may be recycled for other uses, such as construction uses. In some embodiments, the silica aggregate may be further processed so as to recover minor elements contained therein, such as vanadium manganese and chromium.

The method of FIG. 2 may be performed using a system shown in FIG. 1, or using a modified system 300 shown in FIGS. 3A-3B. The system 300 of FIGS. 3A-3B includes similar or substantially the same components as the system of FIG. 1. Specifically, the illustrative system 300 shown in FIG. 3A includes one or more burners 302 providing heat and/or flame into a sanitizer 304, a heating tube 306, a crusher 308, a magnetic separator 310 and a cyclone separator 312. As in the system of FIG. 1, the illustrative sanitizer 304 includes an auger screw conveyor for conveying the RM along the sanitizer 304 and the one or more burners 302 that provide heat and may eject a flame into the sanitizer so as to heat the RM to at least 1200° C., and preferably to at least 1400° C., or within the temperature range of 1400-2000° C. The sanitized RM is then conveyed to the heating tube 306, which may comprise a rotary tube furnace or the like and includes a plurality of fins 307 as described above with respect too FIGS. 1, 6A-6C, and which rotates while heating the RM to, or maintaining the RM at, 600-1500° C. as described above, or within the range of 600-1400° C. or 800-1500° C. As in the embodiments of FIG. 1, the temperature in the sanitizer 304 and the heating tube 306 may be sensed using a thermocouple or other suitable temperature sensor, and may be manually or automatically controlled. Although not shown in FIG. 3A, the temperature in the sanitizer 304 and/or the heating tube 306 may be controlled by a controller programmed to receive information regarding temperature sensed in the sanitizer 304 and/or the heating tube 306 and to adjust the one or more burners 302 and/or the heating tube 306 to supply more or less heat based on the received information. The controller may include one or more processors or circuits for performing the above control.

As shown in FIG. 3A, the processed RM leaving the heating tube 306 is cooled, which may be done in a cooling section following the heating tube 306 using heat exchangers or similar devices, and thereafter conveyed to the crusher 308 which grinds, crushes or mills the RM to a fine powder with a particle size of about 200 mesh or smaller. The fine RM powder is then conveyed to the magnetic separator 310 to magnetically extract the iron and iron oxides from the RM and then conveyed to the cyclone separator 312 to physically separate the aluminum and titanium using gravity separation from the silica aggregate. As discussed above with respect to FIGS. 1 and 2, the titanium oxides may be separated using high strength magnetic separation either after or before physical separation of the aluminum compounds from the RM. As also discussed above, the silica aggregate may be further processed and/or used for other purposes, such as construction and cement or concrete production.

As shown in FIG. 3A, at least some of the system 300 components are enclosed or partially enclosed by a housing 301, which may be in a form of a tube or a rotating tube or a rotating tube furnace. In certain embodiments, the burner 302, the sanitizer 304, the heating tube 306, the crusher, the magnetic separator 310 and/or the cyclone separator 312 have substantially the same configuration as the corresponding components of the system 100 of FIG. 1, and these components are positioned within or partially within the housing 301.

In other embodiments, the housing 301 forms a plurality of sections, each of which corresponds to some or all of the components 302-312 shown in FIG. 3, so that each operation of the respective components 302-312 is incorporated within the housing 301. For example, in some embodiments, the housing 301 comprises a rotating tube having a plurality of sections, with a first section corresponding to the sanitizing section 304 and including one or more burners 302, which may be enclosed, partially enclosed or positioned externally to the housing 301, a calcining section 306 including a plurality of fins 307 and in some cases, including one or more heating sources (e.g., a further burner), a crushing section 308 that includes crushing or grinding equipment, such as a plurality of steel milling balls, a magnetic separation section 310 that includes one or more magnets for generating a magnetic field so as to separate iron and iron oxides from the processed RM powder, and a gravity physical separation section 312 which separates the remaining components using gravity. In some embodiments, the housing 301 further includes one or more cooling sections following the sanitizing section 304 and/or following the calcining section 306. Alternatively, the crushing section 306 may serve as a cooling section while the processed RM is being crushed or milled. Such cooling sections may include one or more heat exchangers or other cooling equipment. In some embodiments of the systems of FIGS. 1 and 3, the heating tube 106/306 or the calcining section 306 in the housing 301 may include multiple tubes or multiple calcining stages.

In some illustrative embodiments of the system of FIG. 3, the housing 301 comprises a rotating tube and includes a cyclone burner 302, or any other suitable burner, to provide heat and/or a flame to the first two sections, i.e., the sanitizing section 304 and the calcining section 306, so as to remove toxic materials from RM such as caustic soda and to reduce the iron and iron oxide compounds in the RM. The cyclone burner 302 may be provided at the entrance to the rotating tube housing 301, as shown in FIG. 3, or may include one or more burners along the length of the first and/or second sections in addition to the cyclone burner 302 or instead of the cyclone burner. The RM may be supplied to the first section of the rotating tube housing using an auger screw conveyor or any other suitable conveyor. The rotating tube housing 301 in these embodiments also includes a third section, i.e., a cooling and crushing section 308, following the first and second sections, for cooling the processed RM and crushing the RM to a fine powder having a particle size of about 200 mesh or smaller using metal milling balls or other suitable crushing devices. Following the third section, a fourth section, i.e., magnetic separator 310, extracts magnetic components, including iron and iron oxides, from the RM powder. A fifth section, i.e., the cyclone separator 312, may also be provided in the rotating tube housing 301 for separating the other components in RM, such as aluminum and/or titanium components, from the remaining silica aggregate. In some embodiments, the cyclone separator 312 may be provided outside of the rotating tube housing 301 and will receive the RM after it is subjected to magnetic separation in the fourth section. Although in the above-described embodiments, the RM is processed using heat first and thereafter crushed or milled before the extraction processes, in other embodiments, the RM may be crushed or milled before the heating processes or between the two heating processes. Moreover, although the sanitizer/sanitizing section 304 in the embodiments of FIG. 3A precedes the heating tube/calcining section 306, in other embodiments, the order of the sanitizer/sanitizing section 304 and the heating tube/calcining section 306 may be reversed. Moreover, in other embodiments, the sanitizer/sanitizing section 304 may be combined together with the heating tube/calcining section 306 so as to include only one heating section.

In certain embodiments, multiple rotating tube housings 301 having the construction described above are used, as shown in FIG. 3B. The multiple rotating tube housings 301 may be driven using one or more motors, and in some embodiments only one motor is used in order to drive the rotation of all of the housings 301. By using multiple rotating tube housings 301, larger quantities of RM may be simultaneously processed at a lower cost.

The use of the rotating tube housing 301 allows multiple steps of the processing of RM to be performed within the same tube. As described above, the tube housing includes a heating area that receives the RM and heats the RM while generating a cyclone in order to process the RM to remove toxic components and to reduce the iron and iron oxides, a cooling a crushing area that cools the processed RM and crushes the RM using ball milling or any other suitable crushing, grinding or milling technique, and a separation area which uses magnetic separation to separate iron and iron oxides from the processed RM and may include a further physical separation for separating aluminum and/or titanium components from silica aggregate using gravity.

The above-described embodiments of the systems and method of processing RM are capable of processing large amounts of RM on a continuous basis so as to convert toxic and hazardous RM from storage pools into non-hazardous and useful components. The above-described embodiments use heat for processing the RM and physical separation, including magnetic and gravity separation, for separating different components of RM, without adding any chemicals or additives. Therefore, no further cleaning of RM or its components is necessary and the extracted components may be used for different purposes. For example, the iron and iron oxide components magnetically extracted from the processed RM are particularly suitable for use in electric arc furnace preparation of steel and potentially in processes of making sheet steel. Moreover, the aluminum oxide recovered by gravity separation may be returned to the Bayer process or may be used for other purposes. Moreover, the remaining silica aggregate, which is non-hazardous to the environment, may be used in construction and for concrete and cement production.

In the method of processing of RM described herein above, the entire process that includes the steps of sanitizing, calcining, and physically separating different components, including iron compounds, aluminum oxide and titanium compounds, is performed without the addition of chemicals or chemical additives to the red mud. That is, these process steps are performed without adding chemical additives, and more specifically, without adding liquid or solid chemical additives. Chemical additives include but are not limited to solvents, organic or inorganic compounds, acids, bases, salts, carbonaceous materials, such as coke, charcoal, etc., calcic compounds, leaching agents and reagents, and other compounds that are not part of the surrounding atmosphere and that are not extracted from red mud itself.

Figure 8:
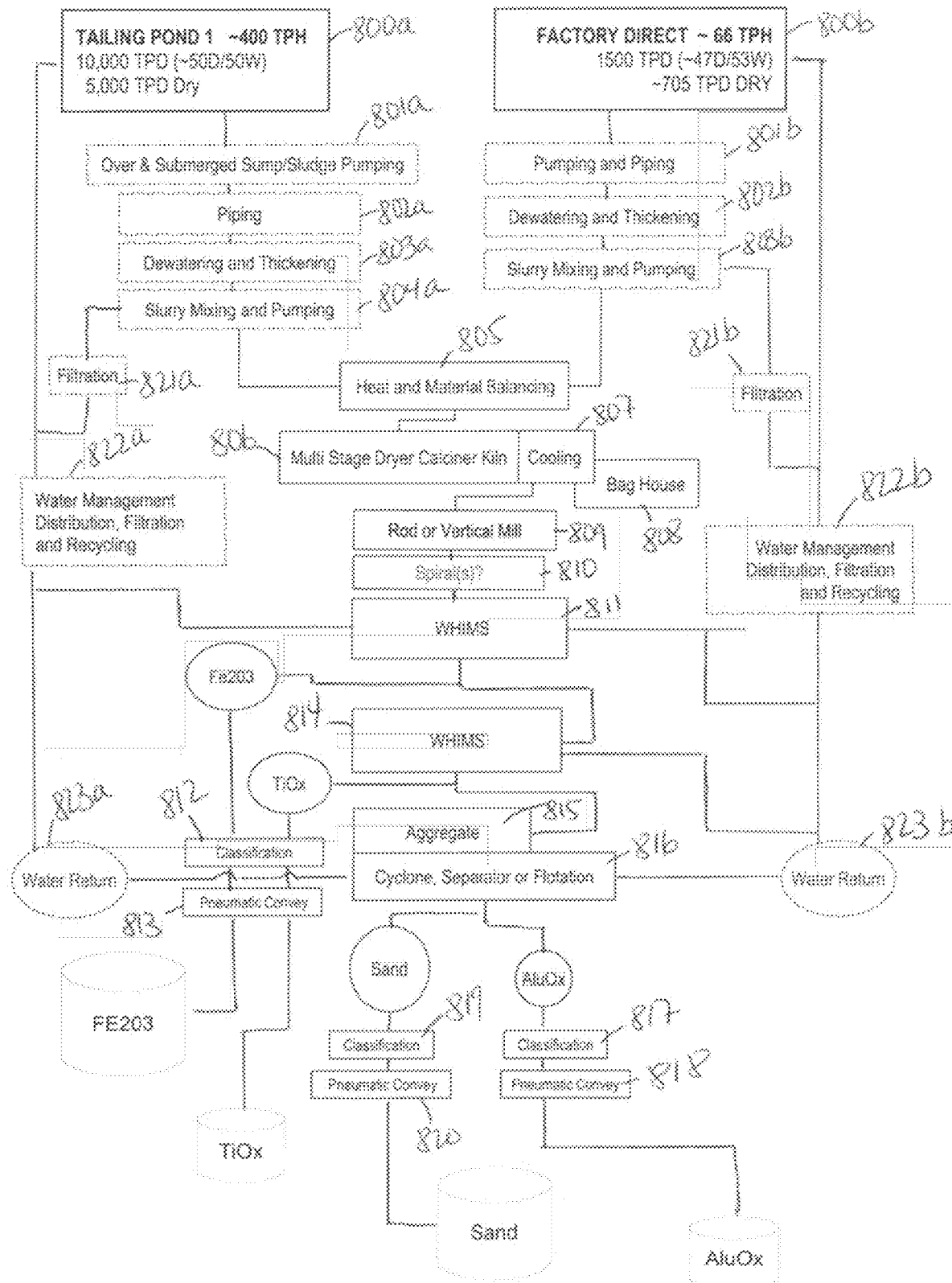
FIG. 8 shows a flow chart with an exemplary method of processing red mud stored in tailing ponds or provided as a factory feed.

FIG. 8 shows a flow chart of an exemplary method of processing red mud stored in tailing ponds and/or fed from a factory, such as an aluminum plant using an exemplary processing system. Generally the same method and system may be used for processing the red mud from both the tailing ponds and directly from a factory, wherein red mud from a tailing pond is pre-processed in steps/stages 801a-804a and red mud fed from a factory is pre-processed in steps/stages 801b-803b before the pre-processed red mud is combined at step/stage 805 and thereafter, processed using the method of the present invention.

Typically, pond tailings contain a considerable amount of water on the surface and are typical red mud lagooning ponds. As shown in FIG. 8, red mud slurry from a tailing pond 800a is pumped using a pumping system in step 801a. The pumping system may be a top and bottom pumping system, including a submerged sump/sludge pump. In step 802a, the red mud slurry is driven through an attached piping system to be filtered/dewatered and thickened to a desired consistency in step 803a. In step 804a, the red mud slurry is mixed and pumped to a heat and material balancing stage 805.

When the red mud is supplied directly from a factory, i.e., factory direct 800b, red mud slurry is pumped from the factory using designated piping in step 801b, filtered/dewatered and thickened to a desired consistency in step 802b, and then mixed and pumped in step 803b to the heat and material balancing stage 805. It is preferred that the red mud provided from the factory directly and the red mud provided from the tailing pond have similar chemical and physical characteristics. In addition, it is preferred that the consistency of the pre-processed red mud slurry from the tailing pond is similar to the consistency of the pre-processed red mud slurry from the factory. In some cases, red mud slurry may be provided for processing from one source, i.e., tailing pond or factory direct, at a time, while, in other cases, red mud may be provided from both sources at the simultaneously.

In the heat and material balancing stage 805, the red mud slurry or red mud slurries are mixed to provide a blend of substantially uniform consistency and to balance the heat energy in the slurries. In some embodiments, the red mud slurry may be crushed or ground, classified and pre-heated in one or more optional stages (not shown) following the heat and material balancing stage 805. The resulting slurry is provided to a multi-stage kiln in step 806 for heating the red mud slurry to a predetermined temperature so as to calcine the red mud therein. As discussed above, the predetermined temperature to which the red mud slurry is heated may be at least 600 degrees C. and in some embodiments is at least 1400 degrees C. The multi-stage kiln may include multiple heating stages so that the red mud slurry is heated to different temperatures in different stages. As shown in FIG. 8, the red mud is cooled in step 807, which may be part of the multi-stage kiln, and a bag house 808 may be provided for filtering of gases and controlling air pollution. Although not shown in FIG. 8, cooling may be performed by using a heat exchanger and resulting heat may be used during the pre-processing and/or pre-heating steps.

Cooled calcined red mud slurry is then subjected to milling or grinding in step 809, which may use a rod or a vertical mill or any other suitable mill. In some embodiments, a spiral separator may be used in step 810 to separate red mud components by density or particle shape, however this step is optional and may be omitted. The red mud slurry is then subjected to physical separation, such as magnetic separation, in step 811 in order to extract iron components, e.g., $Fe_2O_3$, from the red mud. A wet high intensity magnetic separator (WHIMS) or a plurality of WHIMS devices provided in series or in parallel may be used for magnetically separating the magnetic iron components from the red mud. As shown in FIG. 8, separated iron components undergo classification in 812 and are conveyed, such as by using a pneumatic conveyor, in 813 to a designated storage.

The remaining, iron-separated, red mud is subjected to a second physical separation stage, such as another magnetic separation at a higher magnetic intensity, in step 814 in order to extract titanium oxides TiOx from the red mud. WHIMS or a plurality of WHIMS devices may be used for magnetically separating titanium oxides from the red mud. The separated titanium oxides undergo classification in 812 and are conveyed in 813 to a designated storage.

The aggregate in 815 that includes iron and titanium separated red mud is then provided to a third physical separation stage 816, which may be a cyclone, a separator or a flotation device for separating aluminum oxides from the remaining sand in the red mud. As shown in FIG. 8, separated aluminum oxides undergo classification in 817 and are conveyed, such as by a pneumatic conveyor, in 818 to a designated storage. Similarly, separated sand undergoes classification in 819 and is conveyed in 820 to a designated storage therefor.

As discussed above, during pre-processing, red mud from the tailing ponds as well as red mud from the factory undergoes dewatering in order to reduce its moisture content in steps 803a and 802b. Water removed during this process may be filtered using suitable filtration in 821a, 821b and provided for water management, distribution and recycling in 822a, 822b. Similarly, water from the tailing ponds may be provided to the water management, distribution and recycling. As shown in FIG. 8, if required, water recycled from the red mud during pre-processing or during any other steps may be used for wet magnetic separation in WHIMS in steps 811 and 814. Recycled water may also be provided to the third physical separation stage 816, if needed, and/or water may also be recycled back to the water management, distribution and recycling 822a, 822b from the third separation state 816.

Figure 9:
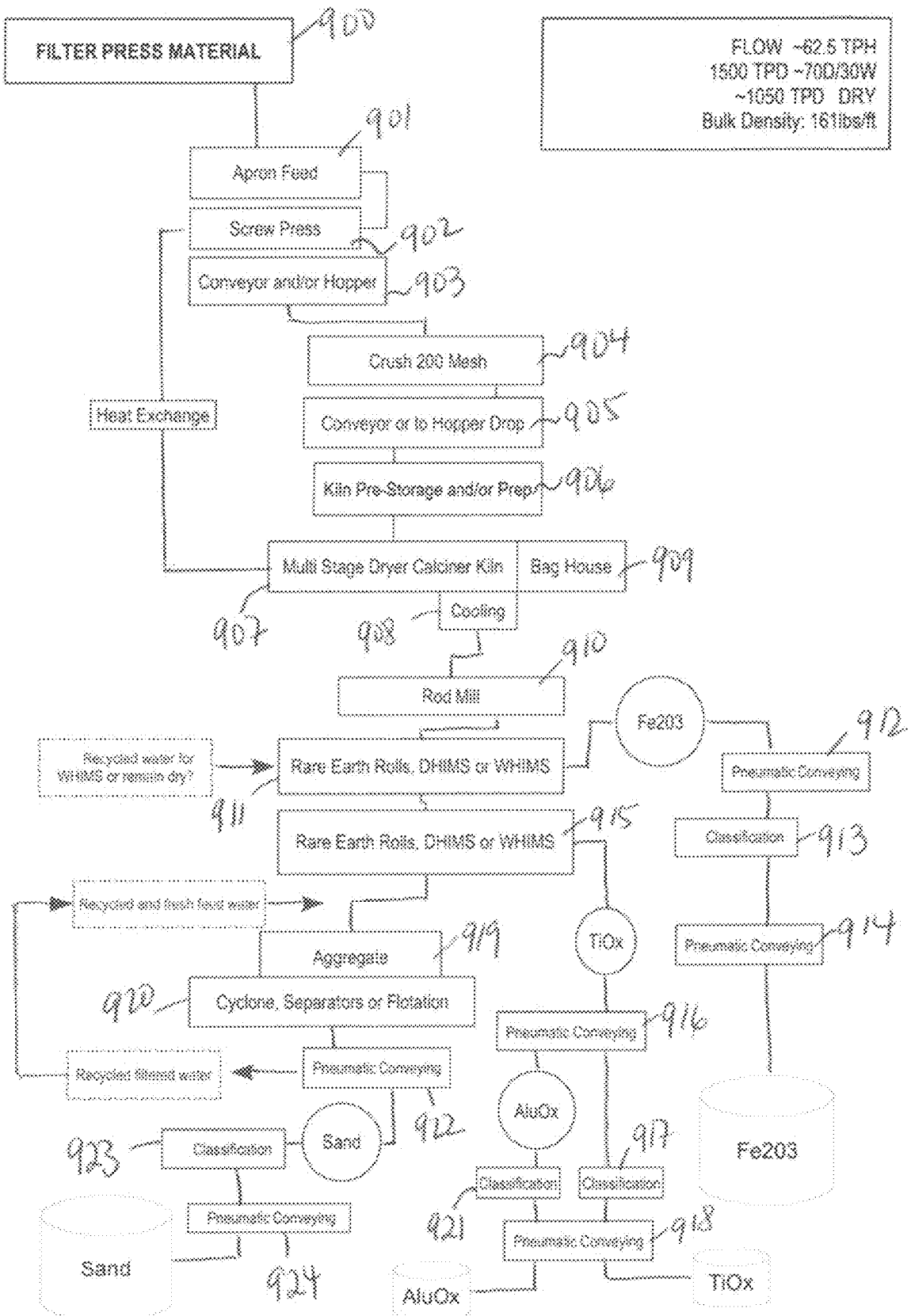
FIG. 9 shows a flow chart of an exemplary method of processing red mud provided from a filter press.

FIG. 9 shows another flow chart demonstrating an exemplary method for processing red mud obtained from a filter press or a similar dewatering device and using an exemplary system. In this case, the red mud may be in stacked form, rather than stored in a lagooning pond, or may be conveyed to the filter press or a similar dewatering device directly from the factory, and has a substantially decreased moisture content. In the method shown in FIG. 9, filter press material 900 is obtained from a filter press or a similar dewatering device which reduces the moisture content in red mud tailings output from a factory. Typically, red mud tailings have a moisture content of around 30%, while the filter press material obtained in step 900 from a filter press device has a moisture content of around 10% or less.

After red mud is reduced in reduced moisture content, it can have a sticky and varied sized cake consistency. The red mud can be loaded using an apron filter in step 901 to drop to a pre-heating screw press in step 902 to balance out the material and to create a more consistent blend. A conveyor or a hopper in step 903 may be used to convey the red mud and to further balance out the red mud material before supplying it to a crusher in step 904.

The crusher grinds or mills the red mud in step 904 to reduce the particle size to around 200 mesh. The resulting crushed red mud is then provided to a pre-storage and/or prep device using a conveyor in step 905. In the pre-storage and/or prep device in step 906, the red mud may be subjected to additional mixing and/or grinding to prepare the red mud materials for addition to the multi-stage calciner kiln for drying and calcining in step 907 and cooling in step 908. As in FIG. 8 described above, the red mud provided to the multi-stage kiln in step 907 is heated to a predetermined temperature so as to calcine the red mud therein. As discussed above, the predetermined temperature to which the red mud slurry is heated is at least 600 degrees C. and in some embodiments is at least 1400 degrees C. The multi-stage kiln may include multiple heating stages so that the red mud slurry is heated to different temperatures in different stages. As shown in FIG. 9, the red mud is cooled in step 908, which may be part of the multi-stage kiln, and a bag house 909 may be provided for filtering of gases and controlling air pollution. Although not shown, cooling may be performed by using a heat exchanger and resulting heat may be used during the pre-processing steps in the screw press 902. Also, excess heat generated in the multi-stage kiln may be used in a heat exchanger for the pre-processing steps 900-903.

Calcined and cooled red mud may be subjected to milling in a dry state in step 910, which is recommended for low ferrous contained hematite and paramagnetic titanium separation used in subsequent steps. The red mud is then subjected to physical separation of iron components, titanium components, aluminum oxides and sand in steps 911, 915, and 920. As shown in FIG. 9, red mud is provided to a first separator stage in 911 to magnetically separate iron components, i.e., $Fe_2O_3$, from the red mud, using rare earth rolls, dry high intensity magnetic separation (DHIMS), WHIMS or Spiral separator. Multiple separators may be provided in parallel or in series to ensure as complete extraction of iron components as possible. When WHIMS or Spiral separator are used in step 911, water may be required to be added to the red mud. The water may be recycled from the red mud from earlier steps and filtered. Iron components are then conveyed in 912 for clarification in step 913, such as secondary grinding, and thereafter conveyed in 914 to a suitable collection or storage.

The remaining iron-separated red mud is then conveyed to the second separator stage 915 to magnetically separate titanium components, i.e., TiOx, from the red mud. Similarly, rare earth rolls, DHIMS or WHIMS (with addition of recycled water) may be used in the second separator stage 915 and multiple separators in parallel or in series may be used. In the second separator stage 915, the separator(s) may be operated at a higher magnetic intensity than in the first separator stage 911. Titanium components extracted from the red mud are then conveyed in 916 for classification, e.g., secondary grinding, in 917 and thereafter conveyed in 918 to a suitable collection or storage.

The remaining aggregate 919 that includes aluminum oxides and sand, as well as small amounts of other metals, is then subject to a third separation stage in 920, which may include a cyclone separator, a gravity separator or a flotation separator, in order to physically separate aluminum oxides AlOx from the remaining sand aggregate. In certain embodiments, water may be added to the cyclone separator, and the water may be recycled from the red mud in earlier steps of the process. Aluminum oxides physically separated in the third separation stage 920 are then subjected to classification in 921, e.g., secondary grinding, and conveyed in 918 to a suitable collection or storage. Similarly, the remaining red mud components, most of which are sand, may be subjected to classification in 923 and conveyed in 924 to a suitable storage.

The methods of FIGS. 8 and 9 described above process red mud to physically extract iron components, titanium components and aluminum components without the addition of chemicals and/or chemical additives to the red mud, except for the compounds that are present in the surrounding atmosphere, e.g., oxygen, $CO_2$, combustion process gases in the atmosphere, etc., or compounds that are extracted from the red mud and recycled back, e.g., water, and more particularly, non-toxic compounds that are extracted from the red mud and recycled back.

In some variations of these methods, water may be added to the red mud in certain steps of the process. This water may be recycled from the red mud itself and filtered before being added back to the red mud. However, in some cases, the methods of FIGS. 8 and 9 may require addition of fresh water, i.e., not recycled. In such embodiments, the methods of FIGS. 8 and 9 are performed without the addition of chemical additives, except for the compounds present in the surrounding atmosphere and water.

The methods described above with respect to FIGS. 2, 8 and 9 may be further modified to add physical extraction of rare earth elements (REEs) without the use of chemical additives, except for water where required or compounds, such as gases, present in the surrounding atmosphere. In one illustrative embodiment, the rare earth elements (REEs) are physically extracted after performing magnetic separation of iron compounds from the red mud and/or after performing magnetic separation of titanium compounds from the red mud. For example, additional steps of REE extraction in one or more extraction stages may be added after step 814 in FIG. 8 or after step 915 in FIG. 9.

Many REEs are paramagnetic at room temperature, so that these materials are weakly attracted by an externally applied magnetic field and form internal, induced magnetic fields in the direction of the applied magnetic field. Some REEs become ferromagnetic at certain temperatures whereby they form permanent magnets or are attracted to magnets. For example, gadolinium (Gd) and terbium (Tb) become ferromagnetic below 289 degrees K and below 230 degrees K, respectively. In addition, dysprosium (Dy), holmium (Ho), erbium (Er) and thulium (Tm) exhibit a transition to an ordered magnetic state, an antiferromagnetic state, when the temperature is lowered, and undergo another transition to become ferromagnetic at still lower temperatures. Cerium (Ce), neoctymium (Nd) and samarium (Sm) become antiferromagnetic at about 10 degrees K. REEs will react to an external magnetic force at just above the element's Neel temperature Tn, which is a temperature at which an antiferromagnetic material becomes paramagnetic. Curie temperature and Neel temperature are both high-temperature values. The key difference between Curie temperature and Neel temperature is that at Curie temperature, the permanent magnetic properties of certain materials are lost whereas, at Neel temperature, antiferromagnetic materials become paramagnetic.

In the present invention, REEs are extracted using magnetic separation at different temperatures. In the steps of REE extraction, material containing REEs, such as iron-separated red mud or iron and titanium separated red mud, is crushed to a particle size of about 200 mesh (74 microns). The material containing REEs is then conveyed, using a conveyor belt or the like, through several thermal stages, in each of which the temperature of the material is reduced to just above the Neel temperature Tn that is specific to the element to be extracted, and the element to be extracted is subjected to magnetic separation. For example, when cerium (Ce) is to be extracted from the material with REEs, the thermal stage reduces the temperature of the material to 13 degrees K, and cerium is then magnetically separated from the remaining material by subjecting the material to a magnetic field. That is, in each thermal stage, the temperature of the material with REEs is reduced to the predetermined temperature that corresponds to the Neel temperature Tn of the element to be extracted, and the material is subjected to a magnetic field so as to magnetically extract the REE element. Below is a listing of different Neel temperatures for REEs that correspond to the temperatures of the thermal stages of REE extraction:

| | |
|---|---|
| Cerium | 13 k |
| Gadolinium | 18 k |
| Thulium | 56 k |
| Dysprosium | 180.2 k |
| Erbium | 85.7 |
| Europium | 91 k |
| Holmium | 132.24 k |
| Lanthanum | 138 k |
| Lutetium | |
| Neodymium | 19.2 k |
| Praseodymium | |
| Promethium | |
| Samarium | 106 k |
| Scandium | |
| Ytterbium | |
| Terbium | 230 k |

It is understood that one or more certain specific REEs can be chosen to be extracted and the material with REEs is then conveyed through one or more thermal zones selected based on the Neel temperatures corresponding to the chosen REEs. The specific REEs to be extracted and the corresponding thermal zones with magnetic extraction may be varied depending on the concentration of REEs in red mud.

In red mud processing, concentration levels of REEs in red mud vary from site to site. For this application, concentration levels of REEs range from <0.19% to <0.002%. On a site with over 150,000,000 tons of stockpiled red mud, the amount of REEs ranges from 285,000 metric tons at <0.19% to 3000 metric tons at <0.002% per element. Therefore, there is a substantial amount of REEs present in the red mud that can be extracted.

In all cases, it is understood that the above-described arrangements are merely illustrative of the many possible specific embodiments which represent applications of the present invention. It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of processing red mud comprising:
   heating red mud to a predetermined temperature;
   grinding the red mud to a predetermined particle size;
   physically extracting iron components from the red mud; and
   physically extracting aluminum components from the red mud, said physically extracting of aluminum components being separate from the physically extracting of iron components,
   wherein the method does not require addition of liquid or solid chemical additives to the red mud for physical extraction of iron components and physical extraction of aluminum components.

2. The method of claim 1, wherein the predetermined temperature is at least 600° C.

3. The method of claim 1, wherein the predetermined temperature is at least 1400° C. and the heating step comprises removing caustic soda from the red mud.

4. A method of processing red mud comprising:
   heating red mud to a predetermined temperature;
   grinding the red mud to a predetermined particle size;
   physically extracting iron components from the red mud; and
   physically extracting aluminum components from the red mud, said physically extracting of aluminum components being separate from the physically extracting of iron components,
   wherein the heating step comprises converting silicon components in the red mud to glass.

5. The method of claim 1, wherein the physically extracting iron components comprises magnetic extraction of iron components from the red mud and the physically extracting aluminum components comprises gravity separation of aluminum components from the red mud.

6. The method of claim 1, wherein the physically extracting of iron components obtains extracted iron components and iron-separated red mud, and wherein the physically extracting of aluminum components comprises physically extracting aluminum components from the iron-separated red mud to obtain aluminum components and aluminum-separated red mud.

7. The method of claim 1, wherein the heating step comprises a first heating step of heating the red mud to a first temperature to remove caustic soda from the red mud and a second heating step of heating the red mud to a second temperature lower than the first temperature to reduce iron components in the red mud.

8. The method of claim 7, wherein the first temperature is at least 1400° C. and the second temperature is between 600° C. and 1400° C.

9. The method of claim 1, further comprising physically extracting one or more of titanium, vanadium, manganese and chromium from the red mud.

10. A method of processing red mud comprising:
    heating red mud to a predetermined temperature;
    grinding the red mud to a predetermined particle size;
    physically extracting iron components from the red mud to obtain separated iron components and iron-separated red mud; and physically extracting titanium components from the iron-separated red mud, wherein the method does not require addition of solid or liquid chemical additives to the red mud for physical extraction of iron components and physical extraction of titanium components.

11. The method of claim 10, wherein the physically extracting iron components comprises magnetically extracting iron components from the red mud at a first magnetic intensity, and the physically extracting titanium components comprises magnetically extracting titanium components from the iron-separated red mud at a second magnetic intensity higher than the first magnetic intensity.

12. The method of claim 10, wherein the physically extracting iron components comprises magnetically extracting iron components from the red mud, and the physically extracting titanium components comprises performing gravity separation to extract titanium components from the iron-separated red mud.

13. The method of claim 10, wherein the heating step, the grinding step, the physically extracting iron components step and physically extracting titanium components step are performed within a common housing.

14. A method of processing red mud comprising:
heating red mud to a predetermined temperature;
grinding the red mud to a predetermined particle size;
physically extracting iron components from the red mud to obtain separated iron components and iron-separated red mud; and
physically extracting titanium components from the iron-separated red mud,
wherein the heating step comprises converting silicon components in the red mud to glass.

* * * * *